(12) United States Patent
Sudo et al.

(10) Patent No.: US 12,478,637 B2
(45) Date of Patent: Nov. 25, 2025

(54) METHOD FOR SUPPRESSING INTERVERTEBRAL DISC PAIN

(71) Applicants: National University Corporation Hokkaido University, Sapporo (JP); Mochida Pharmaceutical Co., Ltd, Tokyo (JP)

(72) Inventors: Hideki Sudo, Hokkaido (JP); Katsuro Ura, Hokkaido (JP); Katsuhisa Yamada, Hokkaido (JP)

(73) Assignees: National University Corporation Hokkaido University, Hokkaido (JP); Mochida Pharmaceutical Co., Ltd., Tokyo (JP)

( * ) Notice: Subject to any disclaimer, the term of this patent is extended or adjusted under 35 U.S.C. 154(b) by 849 days.

(21) Appl. No.: 17/525,054

(22) Filed: Nov. 12, 2021

(65) Prior Publication Data

US 2022/0193118 A1 Jun. 23, 2022

(30) Foreign Application Priority Data

Nov. 13, 2020 (WO) .................. PCT/JP2020/042482

(51) Int. Cl.
*A61K 31/734* (2006.01)
*A61P 29/00* (2006.01)

(52) U.S. Cl.
CPC ............ *A61K 31/734* (2013.01); *A61P 29/00* (2018.01)

(58) Field of Classification Search
CPC .............................. A61K 31/734; A61P 29/00
USPC .......................................................... 514/54
See application file for complete search history.

(56) References Cited

U.S. PATENT DOCUMENTS

| | | |
|---|---|---|
| 2010/0015102 A1 | 1/2010 | Iwasaki et al. |
| 2013/0189231 A1 | 7/2013 | Iwasaki et al. |
| 2014/0213524 A1 | 7/2014 | Iwasaki et al. |
| 2016/0067309 A1 | 3/2016 | Iwasaki et al. |
| 2020/0030367 A1 | 1/2020 | Kondo et al. |
| 2020/0289547 A1 | 9/2020 | Sudo et al. |

FOREIGN PATENT DOCUMENTS

| | | |
|---|---|---|
| EP | 2 210 621 A1 | 7/2010 |
| JP | 6487110 B2 | 3/2019 |
| JP | 2019-528982 A | 10/2019 |
| WO | WO-2009/054181 A1 | 4/2009 |
| WO | WO-2017/163603 A1 | 9/2017 |
| WO | WO-2018/065382 A1 | 4/2018 |

OTHER PUBLICATIONS

U.S. Appl. No. 16/713,659, filed Dec. 13, 2019, Iwasaki et al.
Exploratory clinical trial on the safety and capability of dMD-001 in lumbar disc herniation, UMIN ID: UMIN000034227, Sep. 21, 2018, 13 pages.
Freemont et al., "Nerve growth factor expression and innervation of the painful intervertebral disc," Journal of Pathology, Mar. 21, 2002, 197:286-292.
Guidelines of Lumbar Disc Herniation Treatment, 2nd Edition, 2011, 33-36, 47-49, with English translation of indicated portions, 19 pages.
Japanese Orthopaedic Association (JOA) Clinical Practice Guidelines on the Management of Low Back Pain, 2nd Edition, 2019, 7-8, with English translation of indicated portions, 8 pages.
Miyagi, Masayuki, "Disc Degeneration and pain," The Journal of the Japanese Clinical Orthopaedic Surgery, 2018, 53945-957, with English translation of indicated portions., 29 pages.
Mohd Isa et al., "Implanation of hyaluronic acid hydrogel prevents the pain phenotype in a rat model of invertebral disc injury," Sci. Adv., Apr. 4, 2018, 4:eaaaq0597, 1-19.
Tsujimoto, Takeru, An acellular bioresorbable ultra-purified alginate gel promotes intervertebral disc regeneration via nucleus pulposus progenitor cells, Hokkaido University, Doctor (Medical Science) No. Ko-13013, 2018, 51 pages, with English translation of p. 17-18, 38.
Ura et al., "Examination of intradiscal inflammation-suppressing effect of ultra purified alginate gel in rabbit intervertebral disc hernia model," Abstract of The 39th Annual Meeting of the Research Society for Orthopaedic Biomaterials, 2019, with English translation, 15 pages.
Ura et al., "Examination of intradiscal inflammation-suppressing effect of ultra purified alginate gel in rabbit intervertebral disc hernia model," The 39th Annual Meeting of the Research Society for Orthopaedic Biomaterials, 2019, entire slides with English translation, 28 pages.
Ura et al., "Examination of intradiscal inflammation-suppressing effect of ultra purified alginate gel in rabbit intervertebral disc hernia model," Abstract of 138th The Hokkaido Journal of Orthopedics and Traumatology, 2020, 1-l-1-2, with English translation, 10 pages.
Ura et al., "Examination of intradiscal inflammation-suppressing effect of ultra purified alginate gel in rabbit intervertebral disc hernia model," Oral presentation at 138th The Hokkaido Journal of Orthopedics and Traumatology, 2020, entire slides with English translation, 28 pages.
Ura et al., "Suppressive effect of soft biomaterial on discogenic pain," Abstract of The 35th Research Meeting of the Japanese Orthopaedic Association, 2020, Jan. 8, 2028, with English translation, 25 pages.
Ura et al., "Suppressive effect of soft biomaterial on intervertebral disc pain," Oral presentation at The 35th Research Meeting of the Japanese Orthopaedic Association, 2020, entire slides with English translation, 40 pages.

*Primary Examiner* — Renee Claytor
*Assistant Examiner* — Jaret J Crews
(74) *Attorney, Agent, or Firm* — Foley & Lardner LLP

(57) ABSTRACT

Provided is a composition for suppressing pain which contains a monovalent metal salt of alginic acid, the composition being applied to a nucleus pulposus cavity part to suppress pain at a surgical site and/or a surrounding site thereof which occurs after surgery. Accordingly, a composition is provided, which suppresses pain and/or inflammation at a surgical site and/or a surrounding site thereof which occurs after surgery performed on an intervertebral disc as typified by intervertebral discectomy.

15 Claims, 6 Drawing Sheets

METHOD FOR SUPPRESSING INTERVERTEBRAL DISC PAIN

CROSS-REFERENCE TO RELATED APPLICATIONS

This application claims priority to PCT/JP2020/042482, filed Nov. 13, 2020.

TECHNICAL FIELD

The present invention relates to a composition which suppresses pain and/or inflammation occurring at an intervertebral disc and the vicinity thereof, for example, a composition which suppresses pain and/or inflammation after discectomy.

BACKGROUND ART

In Japan, there are a large number of patients with lower back pain, and according to Comprehensive Survey of Living Conditions of the Ministry of Health, Labour and Welfare, both the morbidity prevalence rate and consultation rate thereof rank high every year. According to a duration of symptoms, lower back pain is roughly divided into three types, i.e., acute lower back pain with a duration lasting shorter than 4 weeks from onset, subacute lower back pain with a duration lasting 4 weeks or longer and shorter than 12 weeks from onset, and chronic lower back pain with a duration lasting 12 weeks or longer from onset (NPL 1: Guidelines of Lower Back Pain Treatment, 2019, Revised, 2nd Edition).

It is reported that there are factors such as intervertebral disc origin, intervertebral joint origin, and fascia origin as causes of lower back pain, and it is also reported that 39% of patients with chronic lower back pain have lower back pain that may be derived from an intervertebral disc (NPL 2: Clinical Orthopedic Surgery, Vol. 53, No. 11, pp 945-950 (2018)).

Inflammation is an extremely important factor in discogenic lower back pain. One of the most important causes of acute phase lower back pain is inflammation in an intervertebral disc. In the chronic phase, inflammation in an intervertebral disc, and infiltration of sensory nerves into the deep inner layer of the annulus fibrosus called neoinnervation are important factors. In disc herniation which is a typical intervertebral disc disease, expression of several inflammatory cytokines including Tumour necrosis factor-α (TNF-α) accelerates. Regarding intervertebral disc degeneration accompanied by pain, it has been confirmed that inflammatory cytokines such as TNF-α and interleukin-6 (IL-6) are present at higher levels than in asymptomatic individuals.

A vertebral column is a columnar skeleton having a series of vertebrae and supports the trunk and the head. Vertebrae are connected to each other by an intervertebral disc between vertebrae. An intervertebral disc is a piece of disc-shaped avascular tissue, and has a structure in which an annulus fibrosus surrounds a nucleus pulposus at the center and endplates are disposed above and below. The nucleus pulposus of the intervertebral disc is a gel-like highly elastic structure with a high water content which is constituted of nucleus pulposus cells and an extracellular matrix thereof, and serves as a cushion for absorbing force applied between the vertebral bodies. The annulus fibrosus is formed of fibrocartilage lamellae and collagen layers surrounding the same, and limits rotary movement between the vertebral bodies. The endplates are hyaline cartilage tissue strongly connecting the intervertebral disc to the vertebral body.

In a vertebra, a hole called a vertebral foramen is present between the anterior vertebral body and the posterior vertebral arch. The canal formed by connecting the vertebral foramen vertically is called the spinal canal through which the spinal nerves pass. A total of 31 pairs of nerves branch from the spinal nerve, one pair on the left and right sides, and the base portion of this nerve is called a spinal nerve root. The surrounding region controlled by each nerve extending from the nerve root is fixed and is distributed in a band shape in the skin. This is called a skin segment.

An intervertebral disc can degenerate or be injured due to aging, trauma, disease, or the like. Intervertebral disc diseases specifically include disc herniation, discopathy, degenerative spondylolisthesis, pyogenic discitis, spondylosis deformans, spinal canal stenosis, intervertebral disc injuries due to trauma, and the like.

In lumbar disc herniation, the nucleus pulposus of the intervertebral disc partially or completely penetrates the posterior annulus fibrosus, and the intervertebral disc tissue protrudes or prolapses into the spinal canal, compressing the cauda equina and nerve roots, and this results in the development of lower back pain and leg pain and neurological symptoms in the lower limbs. Lumbar disc herniation is common among young people between the ages of 20 to 50 years, making them unable to participate in social activities due to severe pain, which is a heavy financial and mental burden.

The clinical symptoms of lumbar disc herniation are often preceded by lower back pain, but are characterized by recognition of strong leg pain. As described above, since the region controlled by each nerve extending from the nerve root is fixed, when the nerve root is compressed, the surrounding region controlled by the compressed nerve root is damaged. That is, leg pain in lumbar disc herniation is often femoral neuralgia for upper lumbar disc herniation and sciatic neuralgia for lower lumbar spine. In the onset of sciatic neuralgia, not only the action of the hernia mass physically compressing the nerve root but also the influence of inflammation have to be considered, and inflammatory cytokines produced from the tissue of the hernia mass have been reported as related factors (NPL 3: Guidelines of Lumbar Disc Herniation Treatment (2011), 2nd Edition).

The initial standard treatment for lumbar disc herniation is conservative treatment such as drug therapy or physiotherapy. After the mid-term, invasive treatment such as discectomy for herniation is performed. Discectomy for herniation is effective in terms of removing degenerated intervertebral disc tissue and relieving nerve compression, but it is known that there is a problem that intervertebral disc degeneration gradually advances after surgery due to tissue defects occurring in the intervertebral disc.

Pain in disc herniation is known to be pain due to compression of nerve roots by hernia protrusion, pain due to nerve adhesion, pain due to inflammation, and the like, and is caused by multiple factors. As mentioned above, pain caused by compression of nerve roots mainly occurs in the lower limbs, and pain caused by inflammation often occurs around a lumbar region, which is a hernia protruding part.

In addition, infiltration of sensory nerves into an intervertebral disc is also important in the onset of pain. Originally, nerve endings are not present in the inner layer of the intervertebral disc, but there is a report of infiltration of sensory nerves, which is called neoinnervation, into the deep inner layer of the annulus fibrosus in a degenerated intervertebral disc (NPL 2: Clinical Orthopedic Surgery, Vol. 53, No. 11, pp 945-950 (2018); and NPL 4: Freemont et al., J Pathol (2002), 197, pp 286-292).

While degeneration of intervertebral discs and disease pathology of intervertebral discs are associated with each other, the severity of degeneration of intervertebral discs and the types of pain are not associated with each other. Some patients have no pain even when the degeneration of an intervertebral disc has advanced, whereas some patients have strong pain even when the degeneration has advanced less.

In fact, with the spread of advanced medical devices including MRI, the situation in which there are many asymptomatic hernias that do not show symptoms such as pain even when hernias are confirmed on MRI images has become known, and in the diagnosis of lumbar disc herniation, it is recommended to comprehensively judge not only by MRI imaging findings but also by interviews and physical findings (NPL 3: Guidelines of Lumbar Disc Herniation Treatment (2011), 2nd Edition).

Because inflammation is involved in pain in patients with lumbar disc herniation, particularly lower back pain occurring in the lumbar region, which is a hernia protruding part, drug therapy with analgesics such as non-steroidal anti-inflammatory drugs (NSAIDs), and nerve block injection with local anesthetics are commonly performed as a treatment for these types of pain.

PTL 1 (Japanese Patent No. 6487110) discloses a composition containing sodium alginate for filling the nucleus pulposus of an intervertebral disc. However, PTL 1 does not disclose pain suppression and/or inflammation suppression.

In addition, as an example of filling a cavity after discectomy, it is shown that discogenic pain is relieved by filling an intervertebral disc with hyaluronic acid in a rat tail vertebra intervertebral disc injury model (NPL 5: Mohd Isa et al., Sci. Adv. (2018), eaap0597), but it is suggested that this is due to the pharmacological action of hyaluronic acid itself.

In addition, NPL 6 (Exploratory clinical trial on the safety and capability of dMD-001 in patients with lumbar disc herniation, UMIN Study Number UMIN000034227, Sep. 21, 2018, retrieved from UMIN-CTR Clinical Trials Registry Information <URL: https://upload.umin.ac.jp/cgi-open-bin/ctr/ctr.cgi?function=brows&action=brows&recptno=R000039018&type=summary&lang uage=J>) discloses patients who are planning to undergo discectomy for lumbar disc herniation, who have lower limb pain, and for whom disc herniation has been recognized in MRI at a site consistent with neurological symptoms, as recruitment criteria for patients for evaluation of the feasibility and safety of implants which is performed by filling a cavity generated after discectomy for lumbar disc herniation with an alginic acid solution, thereafter adding calcium chloride to the surface of the alginic acid solution, and gelling the surface.

CITATION LIST

Patent Literature

[PTL 1] Japanese Patent No. 6487110

Non Patent Literature

[NPL 1] Guidelines of Lower Back Pain Treatment, 2019, Revised, 2nd Edition
[NPL 2] Clinical Orthopedic Surgery, Vol. 53, No. 11, pp 945-950 (2018)
[NPL 3] Guidelines of Lumbar Disc Herniation Treatment (2011), 2nd Edition
[NPL 4] Freemont et al., J Pathol (2002), 197, pp 286-292
[NPL 5] Mohd Isa et al., Sci. Adv. (2018), eaap0597
[NPL 6] Exploratory clinical trial on the safety and capability of dMD-001 in patients with lumbar disc herniation, UMIN Study Number UMIN000034227, Sep. 21, 2018, retrieved from UMIN-CTR Clinical Trials Registry Information <URL: https://upload.umin.ac.jp/cgi-open-bin/ctr/ctr. cgi?function=brows&action=brows&recptno=R000039018&type=summary&lang uage=J>

SUMMARY OF INVENTION

Technical Problem

In some aspects, the present invention provides a composition which suppresses pain and/or inflammation at a surgical site and/or a surrounding site thereof which occurs after surgery performed on an intervertebral disc as typified by intervertebral discectomy, and in a preferred aspect, the present invention provides a composition which suppresses postoperative pain after intervertebral discectomy.

Solution to Problem

The inventors of the present invention examined a possibility of filling of nucleus pulposus with sodium alginate as a therapeutic method for pain and/or inflammation at a surgical site and/or a surrounding site thereof which occurs after surgery performed on an intervertebral disc as typified by intervertebral discectomy. The inventors of the present invention found that, in an intervertebral disc nucleus pulposus defect animal model, the expression of inflammation-related factors such as TNF-α and IL-6 was suppressed by nucleus pulposus filling with sodium alginate, and the expression of TrkA, which is an index of neoinnervation playing an important role in the development of pain, was suppressed. The inventors also found in pain-related behavioral analysis of rats that pain-related behaviors were suppressed.

The inventors of the present invention completed the present invention based on such findings.

Aspects of Invention

Here, the following are provided.

[1] A composition for suppressing pain which contains a monovalent metal salt of alginic acid, the composition being applied to a nucleus pulposus cavity part to suppress pain at a surgical site and/or a surrounding site thereof which occurs after surgery.

[2] The composition according to [1], wherein the cavity is a resected site after discectomy.

[3] The composition according to [1] or [2], wherein the pain is postoperative pain after discectomy.

[3A] The composition according to any one of [1] to [3], wherein the pain is at least one selected from the group consisting of lower back pain, back pain, and buttock pain.

[3B] The composition according to any one of [1] to [3A], wherein the pain is pain associated with inflammation.

[3C] The composition according to any one of [3] to [3B], wherein the postoperative pain is postoperative pain occurring from a postoperative acute phase to a subacute phase.

[3D] The composition according to any one of [3] to [3C], wherein the postoperative pain is at least one selected from the group consisting of lower back pain, back pain, and buttock pain.

[3E] The composition according to any one of [3] to [3D], wherein the postoperative pain is pain associated with inflammation.

[4] A composition for suppressing inflammation which contains a monovalent metal salt of alginic acid, the composition being applied to a nucleus pulposus cavity part to suppress inflammation at a surgical site and/or a surrounding site thereof which occurs after surgery.

[5] The composition according to [4], wherein the cavity is a resected site after discectomy.

[6] The composition according to [4] or [5], wherein the inflammation is postoperative inflammation occurring from an acute phase to a subacute phase after discectomy.

[7] The composition according to any one of [1] to [6], wherein the composition is used such that the composition is applied to the nucleus pulposus cavity part and a crosslinking agent is brought into contact with at least a part of a surface of the composition after the application, and the composition has fluidity when applied to the nucleus pulposus cavity part.

[7A] The composition according to any one of [1] to [6], wherein the composition is used such that the composition is applied to the nucleus pulposus cavity part and is partially cured after the application, and the composition has fluidity when applied to the nucleus pulposus cavity part.

[7B] The composition according to [7] or [7A], wherein the application of the composition to the nucleus pulposus cavity part is performed via a composition-filling inlet on an intervertebral disc surface, and the curing or contacting is performed by bringing a crosslinking agent into contact with the composition-filling inlet on the intervertebral disc surface.

[7C] The composition according to any one of [7] to [7B], wherein the application of the composition to the nucleus pulposus cavity part is performed by applying the composition to a nucleus pulposus defective site formed by removing at least a part of a nucleus pulposus.

[8] The composition according to any one of [7] to [7C], wherein the crosslinking agent is a divalent or higher valent metal ion compound.

[8A] The composition according to [8], wherein the divalent or higher valent metal ion compound is at least one metal ion compound selected from the group consisting of $Ca^{2+}$, $Mg^{2+}$, $Ba^{2+}$, and $Sr^{2+}$.

[9] The composition according to any one of [1] to [8A], wherein a target disease for a surgical medical procedure is at least one disease selected from the group consisting of disc herniation, discopathy, degenerative spondylolisthesis, pyogenic discitis, spondylosis deformans, spinal canal stenosis, and intervertebral disc injuries.

[9A] The composition according to [9], wherein the target disease is disc herniation. [10] The composition according to any one of [7] to [9A], wherein the composition having fluidity may contain an osmoregulating agent in an amount that allows an osmotic pressure in a physiologically acceptable range.

[11] The composition according to any one of [7] to [10], wherein the viscosity of the composition having fluidity is 100 mPa·s to 30,000 mPa·s.

[11A] The composition according to any one of [7] to [11], wherein an apparent viscosity of the composition having fluidity is 100 mPa·s to 30,000 mPa·s by measurement using a cone-plate viscometer (sensor: 35/1), provided that a measurement temperature of the measurement is 20° C., a rotation speed is 0.5 rpm, the measurement is performed for 2.5 minutes as a reading time, and an average value from 0.5 minutes to 2.5 minutes after start is defined as the viscosity.

[12] The composition according to any one of [1] to [11A], wherein a weight-average molecular weight of the monovalent metal salt of alginic acid measured by a GPC-MALS method is 80,000 or more.

[12A] The composition according to any one of [1] to [11A], wherein a weight-average molecular weight (absolute molecular weight) of the monovalent metal salt of alginic acid measured by a GPC-MALS method is 80,000 or more.

[13] The composition according to any one of [1] to [12A], wherein a concentration of the monovalent metal salt of alginic acid is 0.5 w/v % to 5 w/v %.

[13A] The composition according to any one of [1] to [12A], wherein a concentration of the monovalent metal salt of alginic acid is 0.5 w/w % to 5 w/w %.

[14] The composition according to any one of [1] to [13A], wherein the monovalent metal salt of alginic acid is a low endotoxin monovalent metal salt of alginic acid.

[14A] The composition according to any one of [1] to [14], wherein the monovalent metal salt of alginic acid contains 100 EU/g or less of endotoxins.

[15] The composition according to any one of [1] to [14A], wherein the composition does not contain the crosslinking agent in an amount that allows curing of the composition before the application to a nucleus pulposus site or the target nucleus pulposus cavity part of the subject.

[16] The composition according to any one of [1] to [15], wherein the composition does not contain cells.

[17] The composition according to any one of [1] to [16], wherein the composition is applied in combination with at least one selected from the group consisting of a cell and a factor for promoting cell growth.

[17A] The composition according to [17], wherein the cell and the factor for promoting cell growth are applied in combination with at least one selected from the group consisting of nucleus pulposus cells, stem cells, stromal cells, mesenchymal stem cells, bone marrow stromal cells, ES cells, iPS cells, BMP, FGF, VEGF, HGF, TGF-β, IGF-1, PDGF, cartilage-derived-morphogenetic protein (CDMP), CSF, EPO, IL, Platelet Rich Plasma (PRP), SOX, and IF.

[18] The composition according to any one of [1] to [17A], wherein the composition is in a dry state before being applied to the nucleus pulposus site or the nucleus pulposus cavity part.

[18A] The composition according to any one of [1] to [17A], wherein the composition is in a dry state or a solution state before being applied to the nucleus pulposus site or the nucleus pulposus cavity part.

[18B] The composition according to any one of [1] to [17A], wherein the composition is in a dry state at storage and distribution stages.

[19] The composition according to any one of [18] to [18B], wherein the monovalent metal salt of alginic acid in the dry state is a lyophilizate.

[20] A kit containing at least the composition according to any one of [1] to [19] and a crosslinking agent, the kit being used for suppressing pain and/or inflammation at a surgical site and/or a surrounding site thereof.

[21] A method for suppressing pain and/or inflammation at a surgical site and/or a surrounding site thereof which occurs after surgery, the method including:

applying a composition containing a monovalent metal salt of alginic acid and having fluidity to a nucleus pulposus site or a nucleus pulposus cavity part of an intervertebral disc of a subject requiring suppression of pain and/or inflammation at the surgical site and/or the surrounding site thereof, the applying being performed so that a crosslinking agent is brought into contact with at least a part of a surface of the composition.

[21A] A method for suppressing pain and/or inflammation at a surgical site and/or a surrounding site thereof which occurs after surgery, the method including:

applying a composition containing a monovalent metal salt of alginic acid and having fluidity to a nucleus pulposus site or a nucleus pulposus cavity part of an intervertebral disc of a subject requiring suppression of pain and/or inflammation at the surgical site and/or the surrounding site thereof; and curing a part of the applied composition.

[22] The method according to [21] or [21A], wherein the pain is postoperative pain after discectomy.

[22A] The method according to [22], wherein the pain is at least one selected from the group consisting of lower back pain, back pain, and buttock pain.

[22B] The method according to any one of [21] to [22A], wherein the pain is pain associated with inflammation.

[22C] The method according to any one of [22] to [22B], wherein the postoperative pain is postoperative pain occurring from a postoperative acute phase to a subacute phase.

[22D] The method according to any one of [22] to [22C], wherein the postoperative pain is at least one selected from the group consisting of lower back pain, back pain, and buttock pain.

[22E] The method according to any one of [22] to [22D], wherein the postoperative pain is pain associated with inflammation.

[23] The method according to any one of [21] to [22E], wherein the subject is a patient with at least one selected from the group consisting of disc herniation, discopathy, degenerative spondylolisthesis, pyogenic discitis, spondylosis deformans, spinal canal stenosis, and intervertebral disc injuries.

[24] Use of a monovalent metal salt of alginic acid for manufacturing a composition for suppressing pain and/or inflammation at a surgical site and/or a surrounding site thereof which occurs after surgery, the composition being applied to a nucleus pulposus site or a nucleus pulposus cavity part of a subject, the application being performed so that a crosslinking agent is brought into contact with at least a part of a surface of the composition, and the composition having fluidity when applied to the nucleus pulposus site or the nucleus pulposus cavity part.

[25] A monovalent metal salt of alginic acid for suppressing pain and/or inflammation at a surgical site and/or a surrounding site thereof which occurs after surgery, wherein a composition containing a monovalent metal salt of alginic acid and having fluidity is applied to a nucleus pulposus site or a nucleus pulposus cavity part of an intervertebral disc of a subject requiring suppression of pain and/or inflammation at the surgical site and/or the surrounding site thereof, and the application being performed so that a crosslinking agent is brought into contact with at least a part of a surface of the composition.

[A1] A method for suppressing pain at a surgical site and/or a surrounding site thereof which occurs after surgery, the method including:

applying a composition containing a monovalent metal salt of alginic acid to a nucleus pulposus cavity part of an intervertebral disc of a subject requiring suppression of pain at the surgical site and/or the surrounding site thereof.

[A2] The method according to [A1], wherein the cavity is a resected site after discectomy.

[A3] The method according to [A1], wherein the pain is postoperative pain occurring from an acute phase to a subacute phase after discectomy.

[A4] The method according to [A1], wherein the pain is at least one selected from the group consisting of lower back pain, back pain, and buttock pain.

[A5] A method for suppressing inflammation at a surgical site and/or a surrounding site thereof which occurs after surgery, the method including:

applying a composition containing a monovalent metal salt of alginic acid to a nucleus pulposus cavity part of an intervertebral disc of a subject requiring suppression of inflammation at the surgical site and/or the surrounding site thereof.

[A6] The method according to [A5], wherein the cavity is a resected site after discectomy.

[A7] The method according to [A5], wherein the inflammation is postoperative inflammation occurring from an acute phase to a subacute phase after discectomy.

[A8] The method according to [A1] or [A5], wherein the application is used such that a crosslinking agent is brought into contact with at least a part of a surface of the composition after the application, and the composition has fluidity when applied to the nucleus pulposus cavity part.

[A9] The method according to [A8], wherein the crosslinking agent is a divalent or higher valent metal ion compound.

[A10] The method according to [A1] or [A5], wherein a target disease for a surgical medical procedure is at least one disease selected from the group consisting of disc herniation, discopathy, degenerative spondylolisthesis, pyogenic discitis, spondylosis deformans, spinal canal stenosis, and intervertebral disc injuries.

[A11] The method according to [A8], wherein an apparent viscosity of the composition having fluidity is 100 mPa·s to 30,000 mPa·s by measurement using a cone-plate viscometer (sensor: 35/1), provided that a measurement temperature of the measurement is 20° C., a rotation speed is 0.5 rpm, the measurement is performed for 2.5 minutes as a reading time, and an average value from 0.5 minutes to 2.5 minutes after start is defined as the viscosity.

[A12] The method according to [A1] or [A5], wherein a weight-average molecular weight of the monovalent metal salt of alginic acid is 80,000 or more as measured by a GPC-MALS method.

[A13] The method according to [A1] or [A5], wherein a concentration of the monovalent metal salt of alginic acid in the composition is 0.5 w/v % to 5 w/v %.

[A14] The method according to [A1] or [A5], wherein the monovalent metal salt of alginic acid is a low endotoxin monovalent metal salt of alginic acid.

[A15] The method according to [A1] or [A5], wherein the composition is in a dry state before being applied to the nucleus pulposus cavity part.

[A16] The method according to [A1] or [A5], wherein the composition contains at least a low endotoxin monovalent metal salt of alginic acid and a crosslinking agent, and is provided in combination as a kit.

Advantageous Effects of Invention

The composition of the present invention can be used for suppressing pain and/or inflammation at a surgical site and/or a surrounding site thereof which occurs after surgery by being applied to a nucleus pulposus site of a subject. The composition of some aspects can suppress postoperative pain and/or inflammation occurring after discectomy of an intervertebral disc.

Generally, the pain of hernia is relieved by removing the pressure on the nerve root by hernia removal surgery, but the composition of the preferred aspect of the present invention can be used for suppressing postoperative pain occurring after surgery.

The composition of a preferable aspect of the present invention can be used as a material for suppressing postoperative pain and/or inflammation of an intervertebral disc disease such as disc herniation by filling a cavity after intervertebral discectomy.

Furthermore, the composition of a more preferable aspect of the present invention can be injected in a sol state having fluidity into a nucleus pulposus site using a syringe or the like, and also allows filling not only under direct vision but also upon transdermal discectomy (incision of about 5 mm), under a microscope (incision of about 3 to 4 cm), and under an endoscope (incision of about 1 to 2 cm), and therefore a burden on patients can be reduced, and manipulation is relatively easy. That is, a filling operation of the composition of the preferable aspect of the present invention is relatively easy.

Because the composition of a furthermore preferable aspect of the present invention is gelled only on the surface, even if it protrudes into the spinal canal, there is less concern about the spinal nerves being compressed and damaged, making the composition safe. That is, the composition of the furthermore preferable aspect of the present invention has a low risk of complications such as compression on the spinal nerves.

The composition of a particularly preferable aspect of the present invention suppresses postoperative pain and/or inflammation after intervertebral discectomy, thereby enabling early postoperative rehabilitation of a patient.

The composition of the present invention satisfies any one or more of the above-mentioned effects.

DESCRIPTION OF EMBODIMENTS

Figure 1:
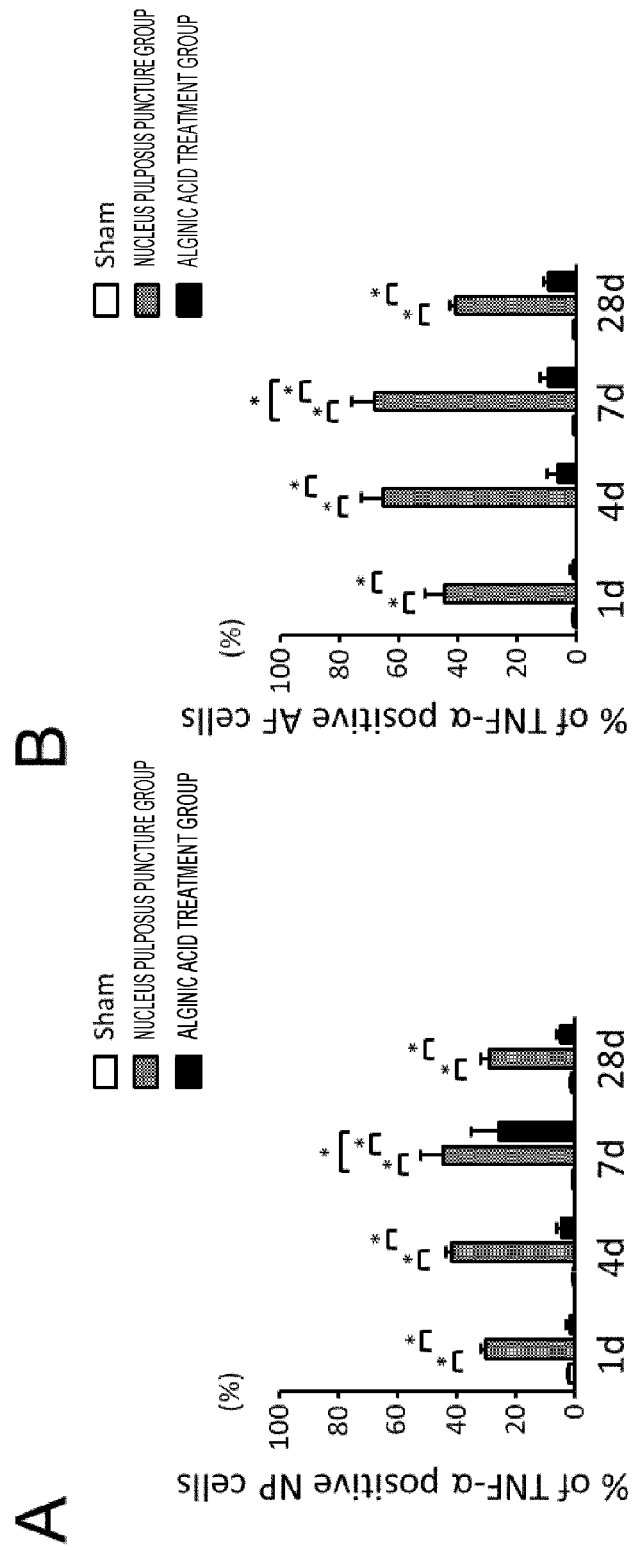
FIG. 1 is a graph showing a TNF-α positive cell rate in a rat intervertebral disc nucleus pulposus defect model. Results for sham, a nucleus pulposus puncture group, and an alginic acid treatment group after 1, 4, 7, and 28 days after puncture of the nucleus pulposus. A) A TNF-α positive cell rate in the nucleus pulposus, and B) a TNF-α positive cell rate in the annulus fibrosus.
Figure 2:
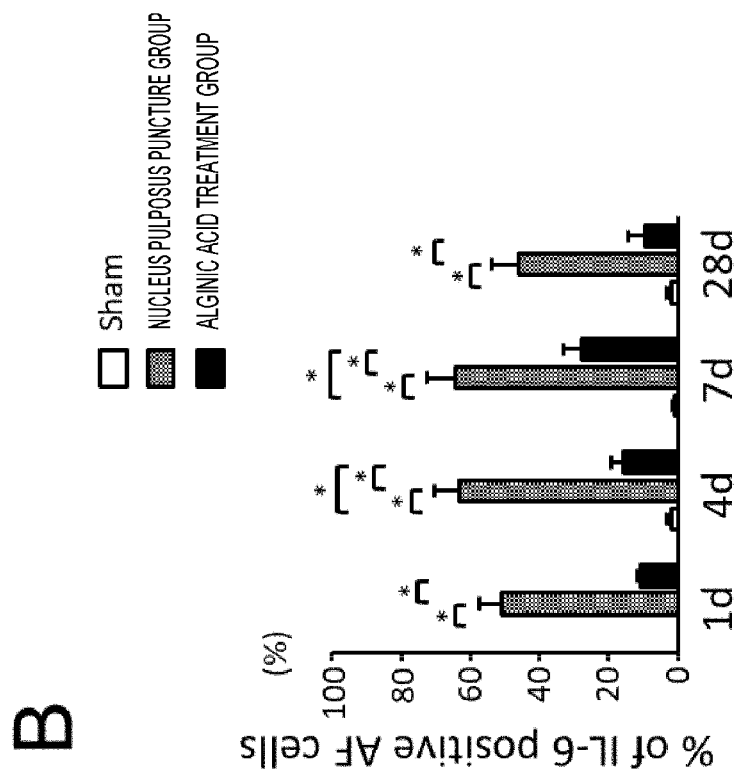
FIG. 2 is a graph showing an IL-6 positive cell rate in a rat intervertebral disc nucleus pulposus defect model. Results for sham, a nucleus pulposus puncture group, and an alginic acid treatment group after 1, 4, 7, and 28 days after puncture of the nucleus pulposus. A) An IL-6 positive cell rate in the nucleus pulposus, and B) an IL-6 positive cell rate in the annulus fibrosus.
Figure 2:
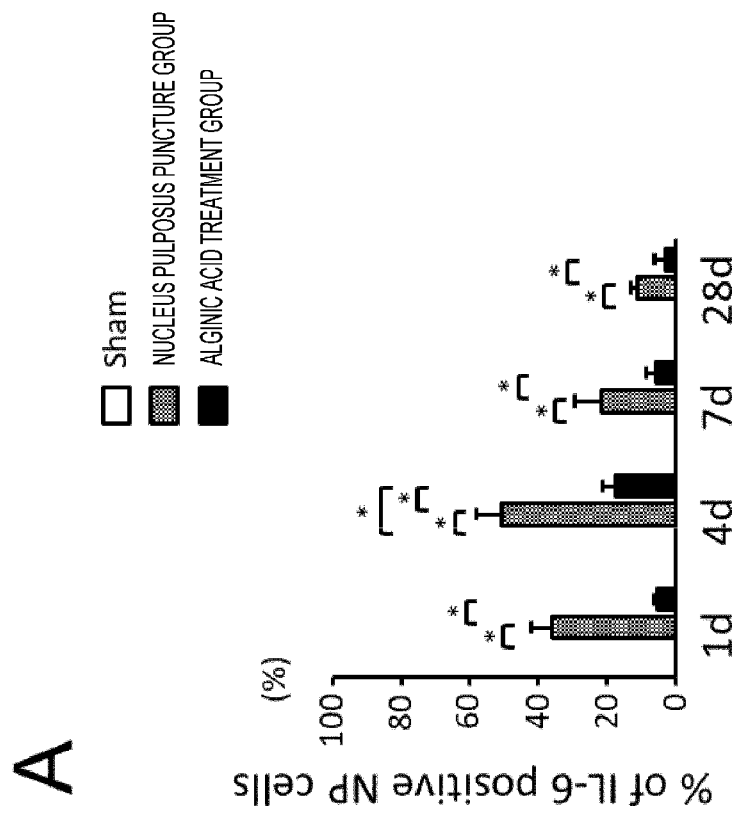

Hereinafter, the present invention will be described in detail.

1. Composition of present invention

A composition of the present invention is a composition for suppressing pain and/or inflammation. More specifically, the composition of the present invention is a composition for suppressing pain and/or inflammation which contains a monovalent metal salt of alginic acid and is used by being applied to a nucleus pulposus cavity part of an intervertebral disc to suppress pain (for example, lower back pain, back pain, buttock pain) and/or inflammation at a surgical site and/or a surrounding site thereof which occurs after surgery.

The "monovalent metal salt of alginic acid" is as described later.

The "intervertebral disc" is a columnar tissue lying between vertebrae forming the vertebral column. An intervertebral disc is a disc-shaped avascular tissue, and has a structure in which an annulus fibrosus surrounds a nucleus pulposus at the center and endplates are disposed above and below.

The "nucleus pulposus" is a gel-like tissue located at the center of an intervertebral disc, which mainly contains nucleus pulposus cells, an extracellular matrix mainly composed of proteoglycan and Type II collagen, and water. The nucleus pulposus is considered to have little self-repairing and regenerating capacity.

"Filling of nucleus pulposus" refers to filling of a degenerated part, a shrunken part, or a removed part of a degenerated, shrunken, or removed nucleus pulposus resulting from aging, trauma, diseases, a surgical operation therefor (for example, an intervertebral discectomy (resection)), or the like. The term "filling of nucleus pulposus" in the present specification is used with the same meaning as "nucleus pulposus replenishment", and a "composition for replenishing a nucleus pulposus" is synonymous with a "composition for filling a nucleus pulposus".

The "nucleus pulposus site" refers to a site where a nucleus pulposus is present, a degenerated or shrunken site of a nucleus pulposus, or a defective part of a nucleus pulposus formed by removing at least a part of the nucleus pulposus, and also includes a surrounding part of the site where the nucleus pulposus is present. The "nucleus pulposus cavity part" includes a degenerated or shrunken site of a nucleus pulposus, a site where a defect has been generated by trauma, or a defective part of a nucleus pulposus formed by removing at least a part of the nucleus pulposus, in the nucleus pulposus site.

The "intervertebral disc disease" or the "target disease for a surgical medical procedure" is a disease that causes degeneration and/or damage to the intervertebral disc. The intervertebral disc diseases and the target diseases for a surgical medical procedure specifically include disc herniation, discopathy, degenerative spondylolisthesis, pyogenic discitis, spondylosis deformans, spinal canal stenosis, intervertebral disc injuries due to trauma, and the like. In some aspects, the intervertebral disc disease or the target disease for a surgical medical procedure is disc herniation. In some aspects, disc herniation is lumbar disc herniation.

"Surgery" is a surgical operation performed on an intervertebral disc, and examples thereof include intervertebral discectomy (resection)).

The "pain at a surgical site and/or a surrounding site thereof" may be postoperative pain associated with an intervertebral disc disease, pain not relieved after discectomy, pain associated with inflammation, pain due to nerve infiltration, pain caused due to physical compression of nerves when the intervertebral disc tissue protrudes or prolapses due to degeneration and/or damage of an intervertebral disc which reoccurs after surgery, postoperative pain due to nerve adhesion, or the like, or may be pain caused due to a combination of these factors. In addition, it is known that the severity of intervertebral disc degeneration and types of pain do not generally correlate with each other. Some patients have no pain even when the degeneration of an intervertebral disc has advanced, whereas some patients have strong pain even when the degeneration has advanced less.

More specifically, the "pain at a surgical site and/or a surrounding site thereof" includes lower back pain, back pain, buttock pain, leg pain, and the like after surgery, more preferably includes lower back pain, back pain and/or buttock pain, and particularly preferably includes lower back pain. These pains may be pain associated with inflammation or may not be pain associated with inflammation, but are preferably pain associated with inflammation. In addition, the "pain at a surgical site and/or a surrounding site thereof" in the present invention is postoperative pain derived from an intervertebral disc and does not include wound pain not derived from an intervertebral disc and preoperative pain due to an intervertebral disc disease, though occasionally, inflammation associated with an intervertebral disc disease may remain in a subject after medical procedure.

The "postoperative pain after discectomy" includes pain associated with inflammation, pain due to nerve infiltration, pain caused due to physical compression of nerves when the intervertebral disc tissue protrudes or prolapses due to degeneration and/or damage of an intervertebral disc which reoccurs after surgery, and the like. Depending on timings, the pain is divided into pain in a postoperative acute phase, pain in a postoperative subacute phase, and pain in a postoperative chronic phase. The composition of a preferable aspect of the present invention can be used for suppressing postoperative pain occurring from the acute phase to the subacute phase.

For example, pain associated with inflammation particularly affects pain from a postoperative acute phase to a postoperative chronic phase. The pain associated with inflammation refers to pain due to inflammation occurring at a surgical site and a surrounding site thereof after discectomy surgery, and occasionally, inflammation and pain associated with an intervertebral disc disease may remain in a subject after medical procedure. In addition, regarding a site of onset, there is a report that pain associated with inflammation in disc herniation mainly develops in a lower back part, a back part, and a buttock part, which are a hernia protruding part and a surrounding site thereof, but development of leg pain is also affected by the inflammation. In the examples of the present specification, it is shown that the expression of inflammation-related factors is suppressed from an early postoperative stage by nucleus pulposus filling with the composition containing sodium alginate, and it is shown that the composition of the preferable aspect of the present invention can be used particularly for suppressing, alleviating, and relieving pain associated with inflammation.

In addition, regarding pain due to nerve infiltration, it is considered that a cavity is generated in an intervertebral disc due to medical procedure of discectomy, and thereby nerve infiltration is likely to occur, and this affects pain from a postoperative subacute phase to a postoperative chronic phase. In the examples of the present specification, it was found that in a group in which a defect is generated in the nucleus pulposus of an intervertebral disc and treatment is not performed thereafter, the expression of TrkA, which is an index of infiltration of sensory nerves into the intervertebral disc, accelerates at the stage of 4 weeks after the surgery, whereas in an alginic acid treatment group, the expression of TrkA is suppressed. That is, it was suggested that alginic acid may prevent the infiltration of sensory nerves into the cavity of nucleus pulposus of the intervertebral disc. As described above, it has been shown that the composition of the preferable aspect of the present invention can be used particularly for suppressing, alleviating, and relieving pain due to nerve infiltration.

In addition, pain, which is caused due to physical compression of nerves when the intervertebral disc tissue protrudes or prolapses due to degeneration and/or damage of an intervertebral disc which reoccurs after surgery, begins from a postoperative subacute phase, and mainly affects pain in a chronic phase. In some aspects, "postoperative pain after discectomy" is postoperative pain generated in a postoperative acute phase or subacute phase, and does not include postoperative pain generated in a postoperative chronic phase. In addition, "postoperative pain after discectomy" in the present invention is postoperative pain derived from an intervertebral disc, and does not include wound pain not derived from an intervertebral disc, and lower back pain for which spinal canal stenosis and compression of the nerve root are recognized by image diagnosis. In addition, in the present specification, pain derived from an intervertebral disc is also referred to as discogenic pain.

Here, the "acute phase" is a duration lasting shorter than 4 weeks from onset, and in particular, the "postoperative acute phase" is a duration lasting shorter than 4 weeks from surgery. The "subacute phase" is a duration lasting 4 weeks or longer and shorter than 12 weeks from onset, and in particular, the "postoperative subacute phase" is a duration lasting 4 weeks or longer and shorter than 12 weeks from surgery. The "chronic phase" is a duration lasting 12 weeks or longer from onset, and in particular, the "postoperative chronic phase" is a duration lasting 12 weeks or longer from surgery.

More specifically, the "postoperative pain after discectomy" includes lower back pain, or back pain, buttock pain, leg pain, and the like. In some aspects, the "postoperative pain after discectomy" is lower back pain, back pain, and/or buttock pain.

The "inflammation at a surgical site and/or a surrounding site thereof which occurs after surgery" means inflammation in an intervertebral disc which occurs after a surgical operation on the intervertebral disc. Here, in patients with inflammation in an intervertebral disc, higher levels of inflammatory cytokines are present than in asymptomatic individuals. The "inflammation at a surgical site and/or a surrounding site thereof" in the present invention is inflammation in an intervertebral disc after surgery and does not include inflammation not derived from an intervertebral disc and preoperative inflammation due to an intervertebral disc disease, though occasionally, inflammation associated with an intervertebral disc disease may remain in a subject after medical procedure. In the examples of the present specification, it is shown that the expression of inflammation-related factors is suppressed from an early postoperative stage by filling of nucleus pulposus with the composition containing sodium alginate, and it is shown that the composition of the preferable aspect of the present invention can be used particularly for suppressing, alleviating, and relieving inflammation occurring after surgery. The composition of a preferable aspect of the present invention can be used for suppressing postoperative inflammation occurring from the acute phase to the subacute phase.

The "subject" refers to a human or a living thing other than a human, for example, a bird and a non-human mammal (for example, a cow, monkey, cat, mouse, rat, guinea pig, hamster, pig, dog, rabbit, sheep, and horse).

The "subject" is preferably a human, more preferably a patient having pain and/or inflammation at a surgical site and/or a surrounding site thereof, particularly a patient having pain and/or inflammation associated with an intervertebral disc disease. It is furthermore preferably a patient to whom discectomy is applied, and particularly preferably a patient having pain and/or inflammation after discectomy.

The "application" means filling of a nucleus pulposus site (for example, a nucleus pulposus cavity part) of an intervertebral disc using the composition of the present invention in an amount sufficient to embed a degenerated part, a shrunken part, a removed part, a defective part, or the like of the nucleus pulposus site. In addition, in the present specification, "filling" is used with the same meaning as "application".

The phrase "partially cured" means as described later.

The phrase "containing a monovalent metal salt of alginic acid" means that the composition of the present invention contains, in an applied nucleus pulposus site, a monovalent metal salt of alginic acid in an amount sufficient to suppress pain and/or inflammation at a surgical site and/or a surrounding site thereof.

The phrase "having fluidity" means as described later.

The phrase "to suppress pain and/or inflammation at a surgical site and/or a surrounding site thereof" is as described later.

The composition of the present invention may be provided in a solution state using a solvent, or in a dry state as a lyophilizate (particularly, lyophilized powder) or the like. If the composition of the present invention is provided in a dry state, it should be used in a state with fluidity such as a solution state using a solvent upon application. The solvent is not particularly limited as long as it can be applied to a biological body, and it may be, for example, injectable water, purified water, distilled water, ion exchange water (or deionized water), Milli-Q water, physiological saline and phosphate buffered physiological saline (PBS). Preferably, it is injectable water, distilled water, physiological saline or the like that can be used for treating a human and an animal.

2. Monovalent Metal Salt of Alginic Acid

The "monovalent metal salt of alginic acid" is a water-soluble salt formed by ion exchange between a hydrogen atom of carboxylic acid at position 6 of alginic acid and a monovalent metal ion such as $Na^+$ or $K^+$. Although specific examples of monovalent metal salts of alginic acid include sodium alginate and potassium alginate, sodium alginate acquirable as a commercially available product is particularly preferable. A solution of a monovalent metal salt of alginic acid forms a gel when mixed with a crosslinking agent.

The "alginic acid" used in the present invention is a biodegradable, high molecular weight polysaccharide that is a polymer obtained by linearly polymerizing two types of uronic acids in the form of D-mannuronic acid (M) and L-gluronic acid (G). More specifically, the alginic acid is a block copolymer in which a homopolymer fraction of D-mannuronic acid (MM fraction), homopolymer fraction of L-gluronic acid (GG fraction) and fraction in which D-mannuronic acid and L-gluronic acid are randomly arranged (MG fraction) are linked arbitrarily. The composite ratio of the D-mannuronic acid to the L-gluronic acid of the alginic acid (M/G ratio) mainly varies according to the type of algae or other organism serving as the origin thereof, is affected by the habitat and season of that organism, and extends over a wide range from a high G type having an M/G ratio of about 0.4 to a high M type having an M/G ratio of about 5.

While a monovalent metal salt of alginic acid is a high molecular weight polysaccharide and it is difficult to accurately determine the molecular weight thereof, it has a weight-average molecular weight generally in a range of 10,000 to 10,000,000, preferably 20,000 to 8,000,000 and more preferably 50,000 to 5,000,000 since too low molecular weight results in low viscosity, by which adhesion to the tissue surrounding the applied site may become weak and too high molecular weight makes the production difficult, lowers solubility, makes handling poor due to too high viscosity in the solution state, makes it difficult to maintain the physical properties during long-term preservation, and the like. In the present specification, numerical ranges expressed with "to" each represent a range that includes the numerical values preceding and following "to" as minimum and maximum values, respectively.

Meanwhile, differences in values according to the measurement method are known to occur in the measurement of molecular weights of high molecular weight substances derived from a natural origin. For example, a weight-average molecular weight measured by gel permeation chromatography (GPC) or gel filtration chromatography (which are also collectively referred to as size exclusion chromatography) is preferably 100,000 or more and more preferably 500,000 or more, while preferably 5,000,000 or less and more preferably 3,000,000 or less. The preferable range is 100,000 to 5,000,000, and more preferably 500,000 to 3,500,000.

Furthermore, an absolute weight-average molecular weight can be measured, for example, by a GPC-MALS method employing a combination of gel permeation chromatography (GPC) and a multi-angle light scattering detector (Multi Angle Light Scattering: MALS). The weight-average molecular weight (absolute molecular weight) measured by the GPC-MALS method is preferably 10,000 or more, more preferably 80,000 or more, and still more preferably 90,000 or more, while preferably 1,000,000 or less, more preferably 800,000 or less, still more preferably 700,000 or less, and particularly preferably 500,000 or less. The preferable range is 10,000 to 1,000,000, more preferably 80,000 to 800,000, still more preferably 90,000 to 700,000, and particularly preferably 90,000 to 500,000.

When a molecular weight of a high molecular weight polysaccharide is calculated by the process described above, usually, there is normally the potential for measurement error of 10 to 20% or more. For example, a molecular weight of 400,000 can fluctuate within the range of 320,000 to 480,000, a molecular weight of 500,000 can fluctuate within the range of 400,000 to 600,000, and a molecular weight of 1,000,000 can fluctuate within the range of 800,000 to 1,200,000.

A molecular weight of a monovalent metal salt of alginic acid can be measured according to a common method.

Typical conditions for molecular weight measurement using gel permeation chromatography are as described in the examples of the present specification. For example, GMPW-XL×2+G2500PW-XL (7.8 mm I.D.×300 mm) may be used as the columns, a 200 mM aqueous sodium nitrate solution can be used as the eluent, and pullulan can be used as the molecular weight standard.

Typical conditions for molecular weight measurement using GPC-MALS are as described in the examples of the present specification. For example, an RI detector and a light scattering detector (MALS) can be used as the detectors.

Although a monovalent metal salt of alginic acid has a large molecular weight and relatively high viscosity when originally extracted from brown algae, the molecular weight becomes smaller and the viscosity becomes lower during the course of heat drying, purification and the like. Through management of the conditions such as the temperature during the production, selection of brown alga used for the raw material, processes like molecular weight fractionation during the production, and the like, monovalent metal salts of alginic acid with different molecular weights can be produced. Furthermore, it can be mixed with a monovalent metal salt of alginic acid from other lot having different molecular weight or viscosity, so as to give a monovalent metal salt of alginic acid having a molecular weight of interest.

A monovalent metal salt of alginic acid used with the present invention is preferably a solution obtained by dissolving a monovalent metal salt of alginic acid into MilliQ water to a concentration of 1 w/w %, where the apparent viscosity as measured with a cone-plate viscometer under the condition of 20° C. is preferably 40 mPa·s to 800 mPa·s and more preferably 50 mPa·s to 600 mPa·s. The conditions for measuring the apparent viscosity preferably follow the conditions described hereinbelow. An "apparent viscosity" in the present specification may simply be referred to as "viscosity".

Although the alginic acid used in the present invention may be of a natural origin or synthetic, it is preferably derived from a natural origin. Examples of naturally-occurring alginic acids include those extracted from brown algae. Although brown algae containing alginic acid are prominently found along seacoasts throughout the world, algae that can actually be used as raw materials of alginic acid are limited, with typical examples thereof including *Lessonia* found in South America, *Macrocystis* found in North America, *Laminaria* and *Ascophyllum* found in Europe, and *Durvillea* found in Australia. Examples of brown algae serving as raw materials of alginic acid include genus *Lessonia*, genus *Macrocystis*, genus *Laminaria* (*Laminariaceae*), genus *Ascophyllum*, genus *Durvillea*, genus *Eisenia* and genus *Ecklonia*.

3. Endotoxin Reduction Treatment

In some aspects, the monovalent metal salt of alginic acid is a low endotoxin monovalent metal salt of alginic acid. Low endotoxin refers to that in which the endotoxin level thereof has been substantially lowered to an extent that does not induce inflammation or fever. More preferably, the monovalent metal salt of alginic acid is preferably subjected to endotoxin reduction treatment. In some other aspects, the monovalent metal salt of alginic acid may not be subjected to the endotoxin reduction treatment.

The endotoxin reduction treatment can be performed by a known method or a method complying therewith. For example, this treatment can be carried out by the method of Suga et al. involving purification of sodium hyaluronate (refer to, for example, Japanese Patent Application Laid-open No. H9-324001), the method of Yoshida et al. involving purification of β1,3-glucan (refer to, for example, Japanese Patent Application Laid-open No. H8-269102), the method of William et al. involving purification of a biopolymer such as alginate or gellan gum (refer to, for example, Japanese Translation of PCT Application No. 2002-530440), the method of James et al. involving purification of polysaccharide (refer to, for example, WO 93/13136), the method of Lewis et al. (refer to, for example, U.S. Patent Specification No. 5589591), the method of Hermanfranck et al. involving purification of alginate (refer to, for example, Appl. Microbiol. Biotechnol. (1994), 40:638-643) or a method complying therewith. The endotoxin reduction treatment is not limited thereto, but rather can be carried out by a known method such as cleaning, purification using filtration with filter (endotoxin removing filter or electrification filter), ultrafiltration or a column (such as an endotoxin adsorption affinity column, gel filtration column or ion exchange column), adsorption to a hydrophobic substance, resin or activated carbon and the like, organic solvent treatment (such as extraction with an organic solvent or precipitation or deposition by addition of organic solvent), surfactant treatment (refer to, for example, Japanese Patent Application Laid-open No. 2005-036036), or a suitable combination thereof. A known method such as centrifugal separation may be suitably combined with these treatment steps. It is desirable that a method is suitably selected according to the type of alginic acid.

The endotoxin level can be confirmed by a known method, and can be measured using a known method such as a method using Limulus reagent (LAL) or Endospecy (registered trademark) ES-24S set (Seikagaku Corporation).

Although there are no particular limitations on the endotoxin treatment method of the monovalent metal salt of alginic acid contained in the composition of the present invention, the endotoxin content of the monovalent metal salt of alginic acid in the case of measuring endotoxin using a limulus reagent (LAL) is preferably 500 endotoxin units (EU)/g or less, more preferably 100 EU/g or less, even more preferably 50 EU/g or less, and particularly preferably 30 EU/g or less as a result thereof. Sodium alginate that has undergone the endotoxin reduction treatment can be acquired as a commercially available products such as Sea Matrix (registered trademark) (Mochida Pharmaceutical), PRONOVA™ UP LVG (FMC BioPolymer) or the like.

4. Preparation of Solution of Monovalent Metal Salt of Alginic Acid

The composition of the present invention may be prepared by using a solution of a monovalent metal salt of alginic acid. The solution of a monovalent metal salt of alginic acid can be prepared by a known method or method complying therewith. Namely, the monovalent metal salt of alginic acid used in the present invention can be produced by a known method such as an acid method or calcium method using the previously described brown algae. More specifically, after extracting from these brown algae using an alkaline aqueous solution such as aqueous sodium carbonate solution, for example, alginic acid be obtained by adding an acid (such as hydrochloric acid or sulfuric acid), and a salt of alginic acid can be obtained by ion exchange of the alginic acid. Preferably, the endotoxin reduction treatment may be performed as previously described. There are no particular limitations on the solvent of the monovalent metal salt of alginic acid provided it is a solvent that can be applied to a biological body, and examples of such solvents include purified water, distilled water, ion exchange water, Milli-Q water, physiological saline and phosphate-buffered saline (PBS). These are preferably sterilized and preferably subjected to endotoxin reduction treatment. For example, Milli-Q water can be used after sterilizing by filtration.

When the composition of the present invention is provided in a dry state as a lyophilizate or the like, the above-described solvent can be used to prepare it into a solution having fluidity.

Moreover, all of the operations for obtaining the composition of the present invention are preferably carried out in an environment at a low endotoxin level and a low bacterial level. For example, the operations are preferably carried out in a clean bench using sterilized tools. The tools used may be treated with a commercially available endotoxin removal agent.

5. Apparent Viscosity of Composition of Present Invention

The composition of the present invention in some aspects is in a liquid state having fluidity, namely, a solution state. The composition of the present invention has fluidity when applied to the nucleus pulposus site (for example, the nucleus pulposus cavity part). In one aspect of the present invention, the composition of the present invention preferably has fluidity that allows injection with a 21G needle following an hour of standing at 20° C. While the apparent viscosity of the composition of the present invention in this aspect is not particularly limited as long as the effect of the present invention can be achieved, it is preferably 10 mPa·s or more, more preferably 100 mPa·s or more, still more preferably 200 mPa·s or more, and particularly preferably 500 mPa·s or more since too low viscosity would weaken adhesion to the tissue surrounding the applied site. It is also preferably 50,000 mPa·s or less, more preferably 20,000 mPa·s or less, and still more preferably 10,000 mPa·s or less since too high apparent viscosity would deteriorate the handling property. An apparent viscosity of 20,000 mPa·s or less would facilitate application with a syringe or the like. Application, however, is also possible even if the apparent viscosity is 20,000 mPa·s or more by using a pressurized or electric filling tool or other means. The composition of the present invention is preferably in a range of 10 mPa·s to 50,000 mPa·s, more preferably 100 mPa·s to 30,000 mPa·s, still more preferably 200 mPa·s to 20,000 mPa·s, yet still more preferably 500 mPa·s to 20,000 mPa·s, and particularly preferably 700 mPa·s to 20,000 mPa·s. In another preferable aspect, it may be 500 mPa·s to 10,000 mPa·s, or 2,000 mPa·s to 10,000 mPa·s. The composition of the present invention in some aspects has viscosity that also allows application to a subject with a syringe or the like.

The apparent viscosity of a composition containing a monovalent metal salt of alginic acid, for example, an aqueous solution of alginic acid, can be measured according to a common method. For example, a coaxial double cylinder type rotational viscometer, a single cylinder type rotational viscometer (Brookfield viscometer), a cone-plate rotational viscometer (a cone-plate viscometer), or the like can be used for the measurement according to a rotational viscometer method. It is preferable to follow the viscosity measurement method of the Japanese Pharmacopoeia (16th edition). According to the present invention, the viscosity measurement is preferably carried out under the condition of 20° C. As will be described below, if the composition of the present invention contains anything that cannot be dissolved in the solvent such as cells, the apparent viscosity of the composition is preferably an apparent viscosity free of cells or the like in order to carry out an accurate viscosity measurement.

In the present invention, it is desirable that an apparent viscosity of the composition containing a monovalent metal salt of alginic acid is particularly measured using a cone-plate viscometer. For example, a measurement preferably takes place under the following measurement conditions. A sample solution is prepared with MilliQ water. The measurement temperature is 20° C. The rotation speed of the cone-plate viscometer is 1 rpm for measuring a 1% solution of the monovalent metal salt of alginic acid, 0.5 rpm for measuring a 2% solution, which can be determined so on. The reading time is 2 minutes of measurement for the 1% solution of the monovalent metal salt of alginic acid to obtain an average value between 1 minute to 2 minutes after the start. The reading time is 2.5 minutes of measurement for the 2% solution to obtain an average value between 0.5 minutes to 2.5 minutes after the start. The test value is an average value of three times of measurements.

The apparent viscosity of the composition of the present invention can be adjusted, for example, by controlling the concentration, the molecular weight, the M/G ratio or the like of the monovalent metal salt of alginic acid.

The apparent viscosity of the monovalent metal salt solution of alginic acid becomes high when the concentration of the monovalent metal salt of alginic acid in the solution is high whereas the viscosity becomes low when the concentration is low. Moreover, the viscosity becomes higher when the molecular weight of the monovalent metal salt of alginic acid is large whereas the viscosity becomes lower when the molecular weight is small.

Since an apparent viscosity of a monovalent metal salt solution of alginic acid is affected by the M/G ratio, for example, an alginic acid can be suitably selected that has an M/G ratio more preferable for viscosity of the solution or the like. The M/G ratio of the alginic acid used with the present invention is about 0.1 to 5.0, preferably about 0.1 to 4.0, and more preferably about 0.2 to 3.5.

As described above, since the M/G ratio is mainly determined by the species of the seaweed, the species of the brown alga used as the raw material affects the viscosity of the monovalent metal salt solution of alginic acid. The alginic acid used with the present invention is preferably derived from a brown alga of genus *Lessonia*, genus *Macrycystis*, genus *Laminaria*, genus *Ascophyllum* and genus *Durvillea*, more preferably from a brown alga of genus *Lessonia*, and particularly preferably derived from *Lessonia* nigrescens.

6. Preparation of Composition of Present Invention

The composition of the present invention is characterized by containing a monovalent metal salt of alginic acid as an active ingredient. The inventors of the present invention found for the first time that when a monovalent metal salt of alginic acid fills the nucleus pulposus site (for example, the nucleus pulposus cavity part) of a biological body, the monovalent metal salt of alginic acid per se suppresses pain and/or inflammation at a surgical site and/or a surrounding site thereof. The phrase "containing as an active ingredient" means that the monovalent metal salt of alginic acid may be contained in an amount enabling suppression of pain and/or inflammation at a surgical site and/or a surrounding site thereof when it is applied to the affected site, which is at least, preferably 0.1 w/v % or more, more preferably 0.5 w/v % or more, and still more preferably 1 w/v % of the whole composition. Although a preferable concentration of the monovalent metal salt of alginic acid in the composition of the present invention cannot be determined unconditionally because it is affected by the molecular weight, it is preferably 0.5 w/v % to 5 w/v %, more preferably 1 w/v % to 5 w/v %, still more preferably 1 w/v % to 3 w/v %, and particularly preferably 1.5 w/v % to 2.5 w/v %. Moreover, in another aspect, the concentration of the monovalent metal salt of alginic acid in the composition of the present invention may be preferably 0.5 w/w % to 5 w/w %, more preferably 1 w/w % to 5 w/w %, still more preferably 1 w/w % to 3 w/w %, and particularly preferably 1.5 w/w % to 2.5 w/w %.

When a monovalent metal salt of alginic acid that is purified to a preferable endotoxin level is used to produce a composition as described above, the endotoxin content of the composition is usually 500 EU/g or less, more preferably 300 EU/g or less, still more preferably 150 EU/g or less, and particularly preferably 100 EU/g or less.

In some aspects, the composition of the present invention is applied in combination with at least one selected from the group consisting of a cell and a factor for promoting cell growth.

In some other aspects, the composition of the present invention does not contain cells.

When applying the composition of the present invention in combination with cells, cells are used. Examples of the cells used include nucleus pulposus cells, stem cells, stromal cells, mesenchymal stem cells and marrow stromal cells. While their sources are not particularly limited, examples include a nucleus pulposus of an intervertebral disc, a bone marrow, an adipose tissue, and an umbilical cord blood. Examples of the cells also include ES cells and iPS cells.

The phrase "to use cells" refers to addition of cells to the composition of the present invention, wherein the cells are prepared, as may be necessary, by a process in which cells of interest are collected and concentrated from a nucleus pulposus of an intervertebral disc, a bone marrow, an adipose tissue, an umbilical cord blood or the like, or a process where the cells are cultured to increase the amount thereof. Specifically, the cells are contained in the composition of the present invention by, for example, $1 \times 10^4$ cells/ml or more, or $1 \times 10^5$ cells/ml or more, preferably $1 \times 10^4$ cells/ml to $1 \times 10^7$ cells/ml. The cells may be commercially available.

The composition of the present invention may be applied in combination with a factor for promoting cell growth. In this case, the composition may also contain a factor for promoting cell growth. Examples of such a factor include BMP, FGF, VEGF, HGF, TGF-β, IGF-1, PDGF, cartilage-derived-morphogenetic protein (CDMP), CSF, EPO, IL, Platelet Rich Plasma (PRP), SOX, and IF. These factors can be produced by a recombination method or may be purified from a protein composition. Here, the composition of the present invention in some aspects does not contain these growth factors. Even in the case of not containing the growth factor, safety is higher than in the case of aggressively promoting cell growth.

The composition of the present invention may contain a factor for suppressing cell death. Examples of a factor that induces cell death include Caspase and TNFα, and examples of a factor for suppressing them include an antibody and siRNA. Such factors for suppressing cell death may be produced by a recombination method or may be purified from a protein composition. Here, the composition of the present invention in some aspects does not contain such factors for suppressing cell death. Even in the case of not containing the factor for suppressing cell death, safety is higher than in the case of aggressively suppressing cell death.

In one aspect of the present invention, the composition of the present invention does not contain a component demonstrating pharmacological action with respect to pain and/or inflammation at a surgical site and/or a surrounding site thereof, other than a monovalent metal salt of alginic acid. Even the composition containing only a monovalent metal salt of alginic acid as an active ingredient can sufficiently suppress pain and/or inflammation at a surgical site and/or a surrounding site thereof.

In some aspects of the present invention, the composition of the present invention can also contain components ordinarily used in pharmaceuticals, such as other pharmaceutically active ingredients and commonly used stabilizers, emulsifiers, osmotic pressure adjusters, buffers, isotonic agents, preservatives, pain relievers or colorants as necessary. The osmotic pressure adjuster is not particularly limited as long as it is pharmaceutically acceptable, and examples thereof include an electrolyte such as sodium chloride, potassium chloride, calcium chloride, and magnesium chloride, glucose, sorbitol, mannitol, trehalose, maltose, and sucrose.

7. Curing of Composition of Present Invention

In some aspects, the composition of the present invention is used such that a crosslinking agent is brought into contact with at least a part of the surface of the composition after being applied to the nucleus pulposus site (for example, the nucleus pulposus cavity part). Alternatively, the composition of the present invention may be used such that it is partially cured after being applied to the nucleus pulposus site (for example, the nucleus pulposus cavity part).

"Partially cured" means to bring a crosslinking agent into contact with a part of the composition of the present invention having fluidity so as to gel and solidify not the whole but a part of the composition in contact with the crosslinking agent. Preferably, the crosslinking agent is brought into contact with at least a part of the surface of the composition of the present invention having fluidity so as to cure a part of the composition of the present invention. In some aspects, "the composition is partially cured after being applied to the nucleus pulposus site" means that at least 50% of the volume of the composition in a 6 mm diameter test tube is not gelled when the test tube is filled with 500 μL of a sodium alginate and a crosslinking agent by employing the same method and ratio for using the crosslinking agent as those employed for filling in the nucleus pulposus site, and leaving the resultant to stand for an hour in vitro according to Example 4 of PTL 1, where the ungelled part may be represented by suction of at least 50% of the volume of the composition in the test tube using a syringe with a 21G needle. As long as the composition shows such property after being filled into the nucleus pulposus site, it is considered that the composition would not deviate therefrom even when compression force is applied from the head and tail sides of the intervertebral disc after the filling. "At least a part of the surface of the composition" refers to, for example, an opening in the surface of the intervertebral disc that leads to the nucleus pulposus, preferably, an opening in the surface of the intervertebral disc that is used for applying the composition to the nucleus pulposus site, namely, an inlet for filling in the composition. Solidification of at least a part of the surface of the composition by gelation can effectively prevent leakage of the composition from the intervertebral disc. A composition-filling inlet on the surface of the intervertebral disc is, for example, preferably an opening formed in the surface of the intervertebral disc with a needle of a syringe or a scalpel for filling in the composition, or an opening in the surface of the intervertebral disc formed with a scalpel or the like upon resection of the herniated disc. In this aspect, an intervertebral disc preferably refers to an annulus fibrosus.

Preferably, the composition of the present invention does not contain a crosslinking agent in an amount that results curing of the composition before application to a nucleus pulposus site of a subject. Therefore, the composition of the present invention may contain a crosslinking agent in an amount that does not result curing of the composition even after a certain period of time. Herein, a certain period of time refers to, but not particularly limited to, preferably about 30 minutes to 12 hours. The phrase "does not contain a crosslinking agent in an amount that results curing of the composition" may be represented, for example, by the composition being injectable with a syringe with a 21G needle after standing at 20° C. for an hour. The composition of the present invention in some aspects does not contain a crosslinking agent.

There are no particular limitations on the crosslinking agent provided it is able to solidify a surface of a solution of a monovalent metal salt of alginic acid by crosslinking that solution. Examples of the crosslinking agent include divalent or higher valent metal ion compounds such as $Ca^{2+}$, $Mg^{2+}$, $Ba^{2+}$, and $Sr^{2+}$, and crosslinking reagents having 2 to 4 amino groups in a molecule thereof. Specific examples of divalent or higher valent metal ion compounds include $CaCl_2$, $MgCl_2$, $CaSO_4$, $BaCl_2$, and the like, while specific examples of crosslinking reagents having 2 to 4 amino groups in a molecule thereof include diaminoalkanes optionally having a lysyl group (—COCH $(NH_2)$—$(CH_2)_4$—$NH_2$) on a nitrogen atom, namely derivatives which form lysylamino groups as a result of a diaminoalkane and amino group thereof being substituted with a lysyl group. Although specific examples thereof include diaminoethane, diaminopropane and N-(lysyl)-diaminoethane, $CaCl_2$ solution is particularly preferable for reasons such as ease of acquisition and gel strength.

In one of some aspects of the present invention, the timing of bringing the crosslinking agent into contact with the surface of the composition of the present invention is preferably after the application of the composition of the present invention to the nucleus pulposus site. A method for bringing a crosslinking agent (for example, a divalent or higher valent metal ion) into contact with a part of the composition of the present invention is not particularly limited and may be, for example, a method in which a solution of the divalent or higher valent metal ion is applied to the surface of the composition with a syringe, a spray or the like. For example, a crosslinking agent may continuously and slowly be applied onto the composition-filling inlet formed in the intervertebral disc by spending several seconds to more than 10 seconds. Thereafter, if necessary, a treatment for removing the crosslinking agent remaining in the vicinity of the filling inlet may be added. The crosslinking agent may be removed, for example, by washing the applied part with a physiological saline or the like.

Preferably, the amount of the crosslinking agent used is appropriately adjusted considering the amount of the composition of the present invention applied, the size of the inlet in the surface of the intervertebral disc for filling the composition, the size of the site of the nucleus pulposus of the intervertebral disc to be applied, and the like. In order not to strongly affect the tissue surrounding the composition-filling inlet with the crosslinking agent, the amount of the crosslinking agent used is controlled not to be too much. The amount of the divalent or higher valent metal ion used is not particularly limited as long as the surface of the composition containing the monovalent metal salt of alginic acid can be solidified. When, for example, a 100 mM $CaCl_2$ solution is used, the amount of the $CaCl_2$ solution used is preferably about 0.3 ml to 5.0 ml, and more preferably about 0.5 ml to 3.0 ml if the diameter of the filling inlet in the surface of the intervertebral disc is about 1 mm. When the filling inlet in the surface of the intervertebral disc is formed with a scalpel or the like upon resection of the herniated disc with the edges of about 5 mm×10 mm, the amount of the 100 mM $CaCl_2$ solution used is preferably about 0.3 ml to 10 ml and more preferably about 0.5 ml to 6.0 ml. The amount can suitably be increased or decreased while observing the state of the composition of the present invention at the applied site.

In the case where calcium is contained in the crosslinking agent, a higher calcium concentration is known to result in rapid gelation and the formation of a harder gel. However, since calcium has cytotoxicity, if the concentration is too high, it may have a risk of adversely affecting the nucleus pulposus of an intervertebral disc. Therefore, in the case of using a $CaCl_2$ solution to solidify the surface of a composition containing a monovalent metal salt of alginic acid, for example, the calcium concentration is preferably set to 25 mM to 200 mM and more preferably 50 mM to 150 mM.

According to the present invention, preferably, the crosslinking agent remaining at the added site after adding the crosslinking agent to the composition and leaving the resultant to stand for a certain period of time, is preferably removed by washing or the like. While the certain period of time for leaving the composition to stand is not particularly limited, it is preferably left to stand for about a minute of longer and more preferably about 4 minutes or longer so as to gel the surface of the composition. Alternatively, it is preferably left to stand for about 1 minute to 10 minutes, more preferably about 4 minutes to 10 minutes, about 4 minutes to 7 minutes, and still more preferably about 5 minutes. The composition and the crosslinking agent are preferably in contact during this certain period of time, and a crosslinking agent may appropriately be added so that the liquid surface of the composition does not dry.

For example, alginate beads can be obtained by dropping a sodium alginate solution into a $CaCl_2$ solution to form gel. The alginate beads, however, need to be applied by being pressed to the site to be applied and those having a size appropriate for the applied site are required, which is technically difficult in an actual clinical practice. Moreover, when a $CaCl_2$ solution is used as a crosslinking agent, the Ca ion on the bead surface makes contact with the surrounding tissue, causing a problem of calcium cytotoxicity. On the other hand, the composition of the present invention in a solution state can easily be applied to sites having any kind of shape and can cover the whole area of the site to be applied with good adhesion to the surrounding tissue. The calcium concentration of the part of the composition of the present invention making contact with the surrounding tissue can be kept low and thus the problem of calcium cytotoxicity is little. Since the part of the composition of the present invention making contact with the surrounding tissue is less affected by the crosslinking agent, the composition of the present invention can easily make contact with the cells and the tissue of the site to be applied. Preferably, the composition of the present invention fuses with the tissue of a biological body at the applied site to an unnoticeable level in about 4 weeks after the application to the nucleus pulposus site, with high affinity to a biological body.

When a part of the composition of the present invention is gelled with the crosslinking agent upon applying the composition of the present invention to the nucleus pulposus site, the composition of the present invention is cured at a part of the affected site and localized thereat in the state of being adhered to the surrounding tissue, thereby preventing leakage from the nucleus pulposus site. In addition, as a result of adhering the composition of the present invention to the surrounding tissue, the effects of the composition of the present invention to suppress pain and/or inflammation at a surgical site and/or a surrounding site thereof can be demonstrated more potently.

When the filling material replenishing the nucleus pulposus site was entirely gelled and cured as a comparative example in the examples of PTL 1, a phenomenon where the cured gel deviated from the composition filling inlet on the surface of the intervertebral disc was observed when compression force was placed on the intervertebral disc from the head and tail sides. On the other hand, when the composition in a solution state was used to fill the nucleus pulposus site, there was no deviation from the filling inlet in the surface of the intervertebral disc even when compression force was placed from the head and tail sides. That is, it can be said that the risk of the replenished composition to leak out is little even against compression to the intervertebral disc from the vertical direction when the composition of the present invention is actually used for filling the nucleus pulposus.

Furthermore, when a cured gel fills the nucleus pulposus site, the cured gel may have a risk of protruding into the spinal canal, which may cause serious neuropathy. On the other hand, the composition of the present invention in a solution state is hardly associated with such a risk with little risk of onset of complications.

8. Application of Composition of Present Invention

The composition of the present invention is used by being applied to the nucleus pulposus site (for example, the nucleus pulposus cavity part) of an intervertebral disc of a human or an organism other than a human, for example, a bird or a non-human mammal (for example, bovine, monkey, cat, mouse, rat, guinea pig, hamster, pig, dog, rabbit, sheep or horse) to suppress pain and/or inflammation at a surgical site and/or a surrounding site thereof.

The composition of the present invention is preferably in a liquid state having fluidity, namely, in a solution state. In the present invention, the phrase "having fluidity" refers to having of a property that causes the form thereof to change to an amorphous form, and does not require that the form constantly have the property of flowing in the manner of a liquid, for example. Preferably, it has fluidity that allows the composition to be sealed in a syringe and injected into a nucleus pulposus site of an intervertebral disc. Furthermore, in one of some aspects of the present invention, the composition preferably has fluidity to be injected into a nucleus pulposus site of an intervertebral disc with a syringe with a 14G to 26G needle, more preferably a 21G needle, after being left to stand at 20° C. for an hour. When the composition of the present invention is provided in a dry state as a lyophilizate or the like, it can be made into a composition to have the above-described fluidity with a solvent or the like upon application.

The composition of the present invention in a solution state can easily be applied to a nucleus pulposus site of an intervertebral disc with a syringe, a pipette for gel, a specialized syringe, a specialized injector, a filling tool or the like.

Since application with a syringe is difficult when the viscosity of the composition of the present invention is high, a pressurized or electric syringe or the like may be used. Even without a syringe or the like, application to a defective part of the nucleus pulposus site can be carried out, for example, with a spatula, a stick or the like. When a syringe is used for injection, for example, a 14G to 27G or 14G to 26G needle is preferably used.

While the method for applying the composition of the present invention to the nucleus pulposus site is not particularly limited, the composition of the present invention is preferably applied to the nucleus pulposus site by using a syringe, a filling tool or the like after exposing the affected site by a known surgical process under direct vision, or under a microscope or an endoscope. In one preferable aspect, a needle of a filling tool or the like can be inserted from the surface of the annulus fibrosus toward the nucleus pulposus site to apply the composition of the present invention.

In a case where the composition of the present invention is in a solution state, it can suit a nucleus pulposus site with any shape including shrinkage of the nucleus pulposus and a cavity or a defective part of the nucleus pulposus site such that it can fill the entire shrinkage, cavity, or defective part of the nucleus pulposus. The shrinkage of the nucleus pulposus and the cavity and the defective part of the nucleus pulposus site may result from degeneration or injury of the intervertebral disc or upon removal or suction of at least a part of the nucleus pulposus by a surgical operation. Preferably, the composition of the present invention is applied to a nucleus pulposus defective part that is formed by removing at least a part of the nucleus pulposus.

While the removal of at least a part of the nucleus pulposus is not particularly limited, it may, for example, be an intervertebral discectomy or the like performed under direct vision, transdermally, under microscopic vision or endoscopically. Alternatively, it may be, for example, a method in which an incision of 2 cm to 10 cm is made in the back to remove the muscle from the rear surface of the posterior element of the vertebral column called a vertebral arch to resect the ligament between the vertebral arches, confirm the nerve and disc herniation, and excise the hernia pressurizing the nerve (Love's method). Alternatively, the method may be one in which the nucleus pulposus is irradiated with laser to reduce the volume of the nucleus pulposus.

After the application of the composition of the present invention to the nucleus pulposus site, the composition can partially be cured with a crosslinking agent as described above.

While the amount of the composition of the present invention applied is not particularly limited and can be determined according to the volume of the applied site of the nucleus pulposus of the subject to be applied, it may, for example, be 0.01 ml to 10 ml, more preferably, 0.1 ml to 5 ml, and still more preferably 0.2 ml to 3 ml. When the composition of the present invention is applied to the nucleus pulposus defective part, it is preferably injected so as to sufficiently fill the volume of the defective part of the nucleus pulposus site.

The number of times and the frequency of the application of the composition of the present invention can be increased or decreased according to the symptoms and the effect. For example, it may be a single application, or regular application once in a month to a year.

Since an alginic acid does not naturally exist in the bodies of animals, animals do not possess an enzyme to specifically degrade the alginic acid. While an alginic acid can be gradually degraded in an animal body due to general hydrolysis, its degradation in the body is milder as compared to a polymer such as hyaluronic acid. In addition, since no blood vessel exists in the nucleus pulposus, the effect of the alginic acid is expected to last long when filled inside the nucleus pulposus.

Even when the composition of the present invention is provided without the above-described cells or growth factors, the composition of the present invention may be used in combination with the above-described cells, growth factors, cell death suppressing factors, and other drugs mentioned below upon application to the nucleus pulposus site.

The composition of the present invention is used by being applied to a nucleus pulposus site to suppress pain and/or inflammation at a surgical site and/or a surrounding site thereof which occurs after surgery. Therefore, the composition of the present invention is preferably used as a composition for suppressing pain and/or inflammation at a surgical site and/or a surrounding site thereof which occurs after surgery. In the present specification, "suppressing pain and/or inflammation at a surgical site and/or a surrounding site thereof" includes prevention, suppression, alleviation, reduction, amelioration, and removal of pain and/or inflammation, reduction in onset rate, delay of onset timing, suppression of advancing, reduction of severity, alleviation of clinical symptoms, and the like.

Preferable aspects of these compositions of the present invention, and a method of using them are as described above.

A target disease for a surgical medical procedure (intervertebral disc disease) is, for example, at least one disease selected from the group consisting of disc herniation, discopathy, degenerative spondylolisthesis, pyogenic discitis, spondylosis deformans, spinal canal stenosis, and intervertebral disc injuries. The intervertebral disc disease is preferably disc herniation, and more preferably lumbar disc herniation.

9. Therapeutic Method

In some aspects, the present invention provides a method for suppressing discogenic pain, preferably suppressing pain from a postoperative acute phase to a subacute phase, the method using the above-mentioned composition and a crosslinking agent to replenish the nucleus pulposus after intervertebral disc surgery.

Preferably, the above-mentioned therapeutic method includes a method in which a cavity part of the nucleus pulposus is replenished with an aqueous solution containing a monovalent metal salt of alginic acid in a state of being highly viscous but having fluidity, and an injection opening of a filling material is gelled with the crosslinking agent to perform treatment so that the filling material does not flow out. More preferably, the above-mentioned therapeutic method is a method for suppressing pain from a postoperative acute phase to a subacute phase by performing the above-mentioned treatment using the above-mentioned material. Furthermore preferably, the above-mentioned therapeutic method is a method for suppressing inflammation of an intramedullary nucleus and an annulus fibrosus from a postoperative acute phase to a subacute phase, and/or a method for suppressing nerve infiltration into an intramedullary nucleus and an annulus fibrosus. The above-mentioned therapeutic method is a method for suppressing postoperative pain by suppressing inflammation of an intramedullary nucleus and an annulus fibrosus from a postoperative acute phase to a subacute phase, and/or suppressing nerve infiltration into an intramedullary nucleus and an annulus fibrosus from a postoperative acute phase to a subacute phase.

In some other aspects, the present invention provides a method for suppressing pain and/or inflammation at a surgical site and/or a surrounding site thereof which occurs after surgery using the composition of the present invention. Preferably, the above-mentioned therapeutic method is a method for suppressing pain and/or inflammation at a surgical site and/or a surrounding site thereof, the method including applying a composition containing a monovalent metal salt of alginic acid and having fluidity to a nucleus pulposus site of an intervertebral disc of a subject requiring suppression of pain and/or inflammation at the surgical site and/or the surrounding site thereof, in which the applying is performed so that a crosslinking agent is brought into contact with at least a part of a surface of the composition. Alternatively, a method for suppressing pain and/or inflammation at a surgical site and/or a surrounding site thereof which occurs after surgery is provided, the method including applying a composition containing a monovalent metal salt of alginic acid and having fluidity to a nucleus pulposus site of an intervertebral disc of a subject requiring suppression of pain and/or inflammation at the surgical site and/or the surrounding site thereof, and curing a part of the applied composition.

The therapeutic method may include a step of removing at least a part of the nucleus pulposus before applying the composition of the present invention to the nucleus pulposus site.

The intervertebral disc disease is, for example, at least one condition or disease selected from the group consisting of disc herniation, discopathy, degenerative spondylolisthesis, pyogenic discitis, spondylosis deformans, spinal canal stenosis, and intervertebral disc injuries. According to the therapeutic method of the present invention in some aspects, the intervertebral disc degeneration and/or the intervertebral disc injury is disc herniation, and particularly lumbar disc herniation.

Preferable aspects of the composition of the present invention, a specific method for applying it to the nucleus pulposus site of the intervertebral disc, a method for curing the composition, meaning of the terms, and else are as described above. The therapeutic method of the present invention can be carried out by suitably combining with other methods or drugs for treating an intervertebral disc.

Furthermore, a co-administered drug, for example, an antibiotic such as streptomycin, penicillin, tobramycin, amikacin, gentamycin, neomycin or amphotericin B, an anti-inflammatory agent such as aspirin, a non-steroidal anti-inflammatory drug (NSAID) or acetaminophen, a proteinase, a corticosteroid drug or a HMG-CoA reductase inhibitor such as simvastatin or lovastatin may be filled before, simultaneous to or after application of the composition of the present invention to the nucleus pulposus site.

These drugs may also be used in a mixing into the composition of the present invention. Alternatively, they may be administered orally or parenterally for co-administration. In addition, if necessary, a muscle relaxant, an opioid analgesic, a neurogenic pain alleviating drug or the like may be administered orally or parenterally for co-administration.

Moreover, in some aspects of the present invention, the above-described cells can be applied to the nucleus pulposus site together with the composition of the present invention. Alternatively, in some aspects of the present invention, a factor for promoting the growth of such cells can be applied to the nucleus pulposus site together with the composition of the present invention. In another favorable aspect of the present invention, the composition of the present invention is not combined with the above-described cells. Alternatively, in another favorable aspect, the composition of the present invention is not combined with a factor for promoting the growth of the cells.

The present invention also relates to use of a monovalent metal salt of alginic acid for manufacturing a composition of the present invention.

Use of the present invention is use of a monovalent metal salt of alginic acid for manufacturing a composition for suppressing pain and/or inflammation at a surgical site and/or a surrounding site thereof which occurs after surgery, in which the composition is applied to a nucleus pulposus site of a subject, the application is performed so that a crosslinking agent is brought into contact with at least a part of a surface of the composition, and the composition has fluidity when applied to the nucleus pulposus site. Alternatively, use of a monovalent metal salt of alginic acid for manufacturing a composition for suppressing pain and/or inflammation at a surgical site and/or a surrounding site thereof which occurs after surgery is provided, in which the composition is used such that the composition is applied to a nucleus pulposus site of a subject and is partially cured after the application, and the composition has fluidity when applied to the nucleus pulposus site.

The present invention further provides a monovalent metal salt of alginic acid for suppressing pain and/or inflammation at a surgical site and/or a surrounding site thereof which occurs after surgery, in which a composition containing the monovalent metal salt of alginic acid and having fluidity is applied to a nucleus pulposus site of an intervertebral disc of a subject requiring suppression of pain and/or inflammation at the surgical site and/or the surrounding site thereof which occurs after surgery, and the application is performed so that a crosslinking agent is brought into contact with at least a part of a surface of the composition. Alternatively, a monovalent metal salt of alginic acid for use in a method for suppressing pain and/or inflammation at a surgical site and/or a surrounding site thereof which occurs after surgery is provided, in which a composition containing the monovalent metal salt of alginic acid and having fluidity is applied to a nucleus pulposus site of an intervertebral disc of a subject requiring suppression of pain and/or inflammation at the surgical site and/or the surrounding site thereof which occurs after surgery, and a part of the applied composition is cured.

10. Lyophilized Preparation and Kit

The present invention provides a kit for suppressing pain and/or inflammation at a surgical site and/or a surrounding site thereof which occurs after surgery.

The kit of the present invention can include the composition of the present invention. The composition of the present invention contained in the kit of the present invention is in a solution state or a dry state, preferably in a dry state, more preferably a lyophilizate, and particularly preferably lyophilized powder. When the composition of the present invention is in a dry state, the kit preferably contains a dissolving solvent (for example, injectable water).

The kit of the present invention may further include a crosslinking agent.

The kit of the present invention may further include a crosslinking agent, a syringe, a needle, a pipette for gel, a specialized filling unit, instructions and the like.

A specific example of a preferable kit is a kit including (1) a vial in which a lyophilizate of a low endotoxin sodium alginate is sealed, (2) an ampule in which a solvent such as injectable water as a dissolving liquid is sealed, (3) an ampule in which a divalent or higher valent metal ion compound such as a calcium chloride solution as a crosslinking agent is sealed, and the like, in a single pack. In another example of a kit is that in which a monovalent metal salt of alginic acid is sealed in one compartment of a syringe composed of two integrally formed compartments divided by a partition, and a solvent as a dissolving liquid or a solution containing a crosslinking agent is sealed in the other compartment, and is composed such that the partition between the compartments can be penetrated easily at the time of use to enable the contents of both compartments to be used by mixing and dissolving at the time of use. Still another example of a kit is that a monovalent metal salt solution of alginic acid is sealed in a pre-filled syringe allowing it to be administered directly at the time of use without requiring a preparation procedure. Still another example is a kit in which an alginic acid solution and a crosslinking agent are sealed in separate syringes and packaged together in a single pack. Alternatively, it may be a kit including a vial filled with a monovalent metal salt solution of alginic acid, an ampule in which a crosslinking agent is sealed, and the like. The "composition of the present invention", the "crosslinking agent", the "syringe", the "filling of nucleus pulposus", and the like are as described above.

The present kit can, for example, be used in a therapeutic method of the present invention.

All documents and publications cited in the present specification are incorporated in the present specification by reference in their entirety regardless of their purposes.

EXAMPLES

While the present invention will be described in more detail by the following examples, the present invention is not to be understood by being limited to the following examples.

Example 1

Preparation of Sodium Alginate Solution

As sodium alginate, the following was used. The endotoxin content was a low endotoxin sodium alginate with less than 50 EU/g. The apparent viscosity and the weight-average molecular weight of each sodium alginate are as shown in the table below. The apparent viscosity measurement of the sodium alginate was conducted by employing a rotational viscometer method (cone-plate rotational viscometer) according to the viscosity measurement method of the Japanese Pharmacopoeia (16th edition). Specific measurement conditions were as follows. Sample solutions were prepared using MilliQ water. As the measurement instrument, a cone-plate rotational viscometer (viscosity and viscoelasticity measurement device RheoStress RS600 (Thermo Haake GmbH) sensor: 35/1) was used. The rotation speeds were 1 rpm when measuring a 1 w/w % sodium alginate solution, and 0.5 rpm when measuring a 2 w/w % sodium alginate solution. The reading times were 2 minutes of measurement for the 1 w/w % solution to obtain an average value between 1 minute to 2 minutes after the start of the measurement, and 2.5 minutes of measurement for the 2 w/w % solution to obtain an average value between 0.5 minutes to 2.5 minutes after the start of the measurement. An average value of three times of measurements was used as a measurement value. The measurement temperature was 20° C.

The weight-average molecular weight of each sodium alginate was measured by two kinds of measurement methods, which are gel permeation chromatography (GPC) and GPC-MALS. The measurement conditions were as follows.

[Pretreatment Method]

An eluent was added to the sample for dissolving, and a product filtrated through a 0.45 μm membrane filter was used as a measurement solution.

(1) Gel Permeation Chromatography (GPC) Measurement

[Measurement Conditions (Relative Molecular Weight Distribution Measurement)]

Columns: TSKgel GMPW-XL×2+G2500PW-XL(7.8 mm I.D.×300 mm×3 columns)
Eluent: 200 mM aqueous sodium nitrate solution
Flow rate: 1.0 mL/min
Concentration: 0.05%
Detector: RI detector
Column temperature: 40° C.
Injected amount: 200 μL
Molecular weight standard: Pullulan standard, glucose (2) GPC-MALS Measurement

[Refractive Index Increment (dn/dc) Measurement (Measurement Conditions)]

Differential refractometer: Optilab T-rEX
Measurement wavelength: 658 nm
Measurement temperature: 40° C.
Solvent: 200 mM aqueous sodium nitrate solution
Sample concentrations: 0.5 to 2.5 mg/mL (5 concentrations)

[Measurement Conditions (Absolute Molecular Weight Distribution Measurement)]

Columns: TSKgel GMPW-XL×2+G2500PW-XL(7.8 mm I.D.×300 mm×3 columns)
Eluent: 200 mM aqueous sodium nitrate solution
Flow rate: 1.0 mL/min
Concentration: 0.05%
Detector: RI detector, light scattering detector (MALS)
Column temperature: 40° C.
Injected amount: 200 μL

[Table 1]

TABLE

| Apparent viscosity (mPa · s) | | Weight-average molecular weight | | M/G ratio |
|---|---|---|---|---|
| 1 w/w % | 2 w/w % | GPC | GPC-MALS | |
| 300 to 600 | 3,000 to 6,000 | 1,100,000 to 1,800,000 | 200,000 to 400,000 | 0.2 to 1.8 |

The above-mentioned sodium alginate was dissolved in physiological saline to prepare a 2 w/v % sodium alginate solution, which was used in the following examples.

Example 2

Changes in Inflammation and Pain-Related Factors Due to Sodium Alginate Filling in Intervertebral Disc Nucleus Pulposus Defect Animal Model Each of a rat intervertebral disc nucleus pulposus defect model and a rabbit intervertebral disc nucleus pulposus defect model was filled with the sodium alginate solution to measure TNF-α, IL-6, and TrkA positive cell rates in the nucleus pulposus (NP) and the annulus fibrosus (AF).

1-(1) Production of Rat Intervertebral Disc Nucleus Pulposus Defect Model and Filling with Sodium Alginate A rat nucleus pulposus puncture model was used in immunohistochemical staining analysis and pain-related behavioral analysis. 12-week-old female SD rats (260 to 300 g) were randomly allocated (n=3, each timing and each group) into a group in which only skin was incised (sham group), a group in which only a nucleus pulposus was punctured (nucleus pulposus puncture group), and a group in which the sodium alginate solution was injected after nucleus pulposus puncture to cure a surface (alginic acid treatment group).

The rats were maintained under anesthesia by intraperitoneal injection of a mixture of ketamine and medetomidine (ketamine:medetomidine=75 mg/kg:0.5 mg/kg) after induction of anesthesia by inhalation of 5% isoflurane. After confirming the depth of anesthesia by a tail knob test using forceps, the dorsal skin of the Co4/5 to 5/6 intervertebral discs was incised. The connective tissue was dissected to expose Co4/5 to 5/6, and the nucleus pulposus of the Co4/5 to 5/6 intervertebral discs was punctured through the annulus fibrosus using a 19G needle to create a defective part (diameter 1 mm, depth 2 mm).

A 2% (w/v) sodium alginate solution dissolved in physiological saline was prepared by the method described in Example 1, and a 4 μl sodium alginate solution was immediately injected into the nucleus pulposus defective part using a microsyringe (Hamilton) equipped with a 26G needle. Next, 102 mM $CaCl_2$ (1 ml) was added dropwise onto sodium alginate to gel the surface. After 5 minutes, the surgical site was washed with physiological saline, gelation was confirmed, and thereafter the fascia, the connective tissue, and the skin were suture closed.

1-(2) Production of Rabbit Intervertebral Disc Nucleus Pulposus Defect Model and Filling with Sodium Alginate A rabbit nucleus pulposus aspiration model was used for immunohistochemical staining analysis. 4- to 5-month-old male Japanese white rabbit (3.2 to 3.5 kg) were randomly allocated into a group in which only aspiration was performed (nucleus pulposus aspiration group) and a group in which a sodium alginate solution was injected after nucleus pulposus aspiration to cure a surface (alginic acid treatment group).

After anesthesia in the same method as in the rat nucleus pulposus puncture model, L2/3 to 4/5 of intervertebral discs were exposed by the retroperitoneal approach. Annulus fibrosus puncture was performed using an 18G needle to suck the nucleus pulposus tissue from the L2/3 and L4/5 intervertebral discs using a 10 ml syringe until the contents could not be sucked. L3/4 was used as a control and was not subjected to the treatment. In the alginic acid treatment group, after sucking of the nucleus pulposus tissue, 20 μl of the sodium alginate solution was implanted and gelled as in the same manner as in the case of the rats. After 5 minutes, the surgical site was washed with physiological saline, gelation was confirmed, and thereafter the fascia, the connective tissue, and the skin were suture closed.

1-(3) Immunohistological Evaluation

Immunohistochemical staining of the intervertebral discs of the rats and rabbits was performed to detect TNF-α and IL-6 positive cell rates after 1, 4, 7, and 28 days after surgery. Furthermore, for the intervertebral discs of the rats, TrkA positive cell rates were detected after 1, 4, 7, and 28 days after surgery. The expression of TNF-α and IL-6, which are inflammatory cytokines, accelerates under the inflammatory response. TrkA, which is a receptor for a nerve growth factor NGF, is a pain-related index and also an index of infiltration (neoinnervation) of sensory nerves into the deep inner layer of the annulus fibrosus, which is an important factor in discogenic pain.

Rats (each timing and each group n=3) were deeply anesthetized by inhalation of isoflurane and euthanized by cervical dislocation. Rabbits (each timing and each group n=3) were euthanized by intravenous injection of heparin (10,0000 units) and thereafter intravenous injection of pentobarbital sodium in an overdose.

In the rat model, the entire tail (Co4/5 to Co5/6) was surgically excised, and soft tissue was removed under aseptic conditions to collect only the tail vertebra and intervertebral disc. In the rabbit model, the entire spine (L2/3 to L4/5) was surgically excised, and soft tissue and vertebrae were removed under aseptic conditions to collect only the intervertebral disc.

The collected intervertebral discs (rats and rabbits) were fixed with 4% (w/v) paraformaldehyde (48 hours at room temperature) and embedded in paraffin. The test sample was crossed at the center of the intervertebral disc to obtain a cross-sectional section (thickness 5 μm) at the center of the coronal section. The section was deparaffinized with xylene and thereafter cultured in proteinase K (Dako, Agilent Technologies, Santa Clara, CA, USA) (37° C., for 15 minutes). Subsequently, it was blocked with 1% hydrogen peroxide methanol (w/v) (37° C., for 30 minutes), cultured in 2% (w/v) bovine serum albumin (room temperature, for 30 minutes), and thereafter cultured with a primary antibody overnight at 4° C. An anti-TNF-α mouse monoclonal antibody (NBP2-34372, Novus Biologicals, Centennial, Colorado, USA) and an anti-IL-6 mouse monoclonal antibody (MAA079Rb21, Cloud-Clone Corp., Houston, Texas, USA) were used for the rabbit intervertebral disc. An anti-TNF-α mouse monoclonal antibody (ab220210, Abcam, Cambridge, UK), an anti-IL-6 mouse monoclonal antibody (ab9324, Abcam), and an anti-TrkA rabbit monoclonal antibody (ab86474, Abcam) were used for the rat model. For color development, Histofine (registered trademark) Fast Red II (Nichirei Bioscience) for TNF-α analysis, HistoGreen Substrate kit for Peroxidase (Cosmo Bio Co., Ltd., Tokyo, Japan) for IL-6 analysis, and Histofine (registered trademark) DAB (Nichirei Bioscience) for TrkA analysis were used. For the purpose of improving visibility, contrast staining of cell nuclei was performed, and hematoxylin was used for TNF-α or TrkA staining, and fast red was used for IL-6 staining. Using a light microscope (Olympus, Tokyo, Japan), TNF-α, IL-6, or TrkA positive cells were individually counted in five randomly selected visual fields, and the number of positive NP or AF cells in each staining was calculated as a percentage with respect to the total number of NP or AF cells in the visual field. All evaluations were performed by two blinded independent observers. Each observer performed three evaluations on one test sample, and an average value was calculated for each test sample to perform comparison between each group.

Figure 3:
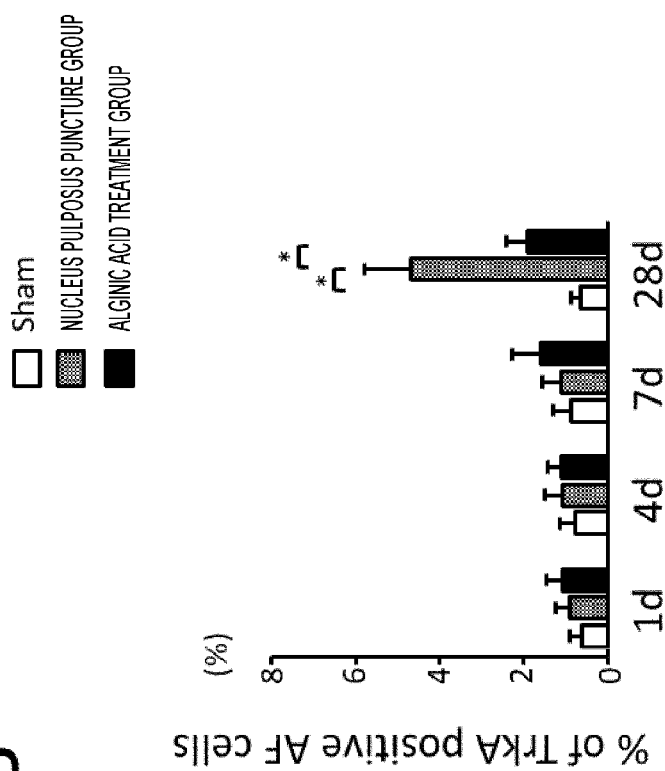
FIG. 3 is a graph showing a TrkA positive cell rate in a rat intervertebral disc nucleus pulposus defect model. Results for sham, a nucleus pulposus puncture group, and an alginic acid treatment group after 1, 4, 7, and 28 days after puncture of the nucleus pulposus. A) A TrkA positive cell rate in the nucleus pulposus, and B) a TrkA positive cell rate in the annulus fibrosus.
Figure 3:
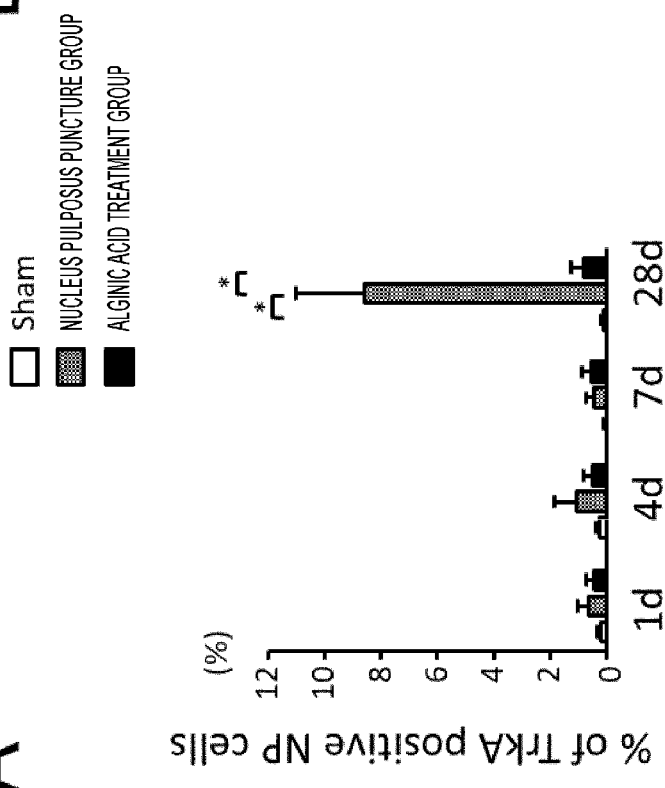
Figure 4:
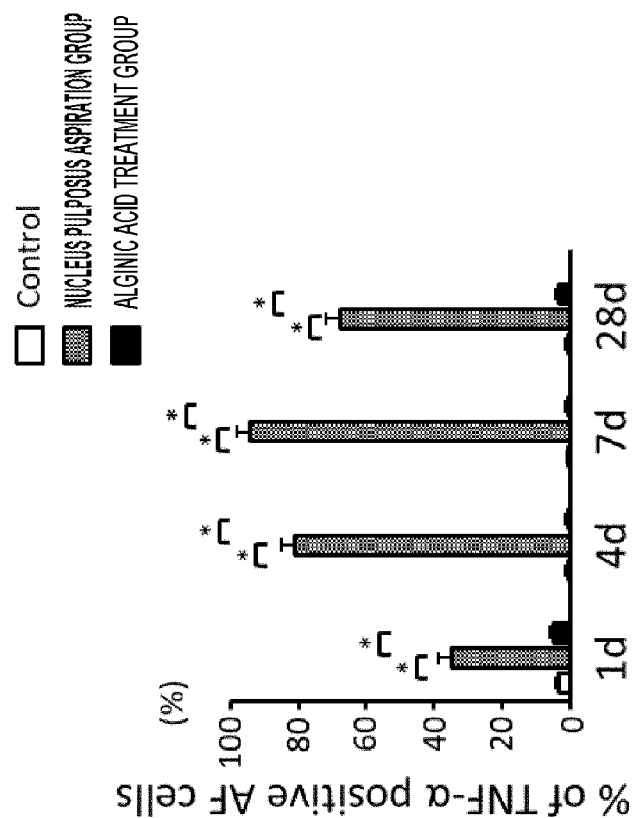
FIG. 4 is a graph showing a TNF-α positive cell rate in a rabbit intervertebral disc nucleus pulposus defect model. Results for control, a nucleus pulposus aspiration group, and an alginic acid treatment group after 1, 4, 7, and 28 days after aspiration of the nucleus pulposus. A) A TNF-α positive cell rate in the nucleus pulposus, and B) a TNF-α positive cell rate in the annulus fibrosus.
Figure 4:
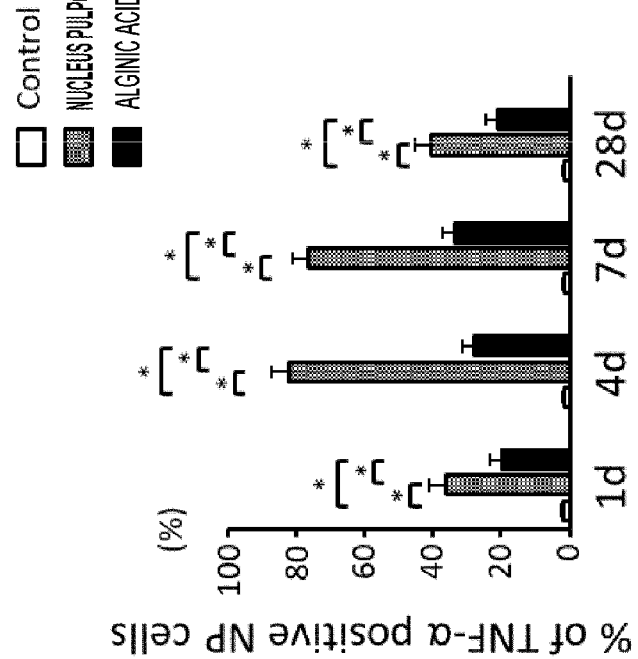
Figure 5:
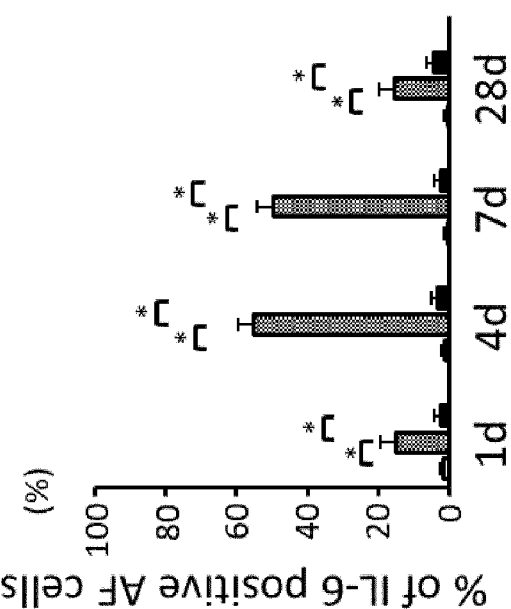
FIG. 5 is a graph showing an IL-6 positive cell rate in a rabbit intervertebral disc nucleus pulposus defect model. Results for control, a nucleus pulposus aspiration group, and an alginic acid treatment group after 1, 4, 7, and 28 days after aspiration of the nucleus pulposus. A) An IL-6 positive cell rate in the nucleus pulposus, and B) an IL-6 positive cell rate in the annulus fibrosus.
Figure 5:
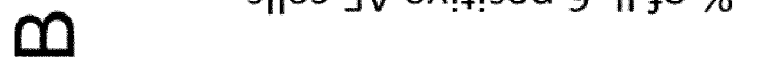
Figure 5:
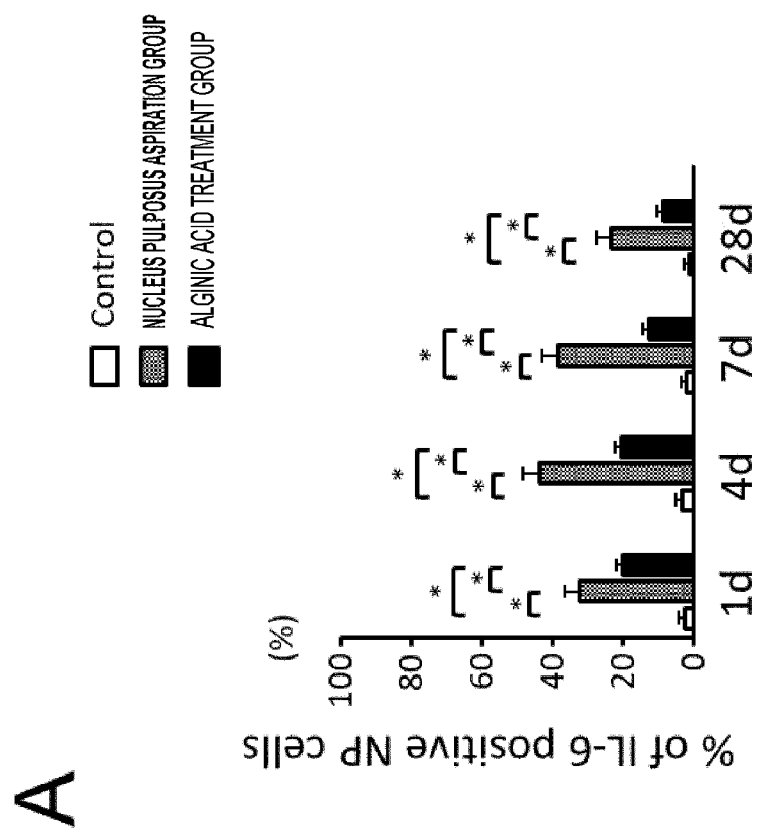

As a result, as shown in FIGS. 1, 2, 4, and 5, in both the nucleus pulposus and the annulus fibrosus, and in both the rabbit model and the rat model, TNF-α and IL-6 positive cell rates were both significantly lower values in the alginic acid treatment group as compared with the nucleus pulposus aspiration or nucleus pulposus puncture groups. In addition, as shown in FIG. 3, the TrkA positive cell rate used as a marker of nerve infiltration increased at the stage of 28 days after surgery in the nucleus pulposus puncture group of the rat model, whereas the rate decreased in the alginic acid treatment group, suggesting that the nerve infiltration (neoinnervation) into the intervertebral disc, which is an important factor in pain, was suppressed. That is, it was suggested that the implantation of alginic acid suppresses the expression of inflammatory cytokines and nerve growth factor receptors caused by intervertebral disc damage in an acute phase and a subacute phase, suggesting a possibility of usefulness also for reducing postoperative pain and postoperative inflammation.

Example 3

Pain Suppressing Effect of Sodium Alginate Filling in Rat Intervertebral Disc Nucleus Pulposus Defect Model Each of the rat intervertebral disc nucleus pulposus defect model was filled with a sodium alginate solution, and behavioral experiments were performed to evaluate the pain suppressing effect.

The rat intervertebral disc nucleus pulposus defect models created by the method described in Example 2 were used for pain-related behavioral analysis. A total of 18 rats underwent the Hargreaves, von Frey, and tail flick tests. In each test, each rat individually spent 20 minutes in the test environment to acclimatize to the environment before 24 hours and just before the test (NPL 5: Mohd Isa et al., Sci. Adv. (2018) eaap0597). All tests were conducted by the same blinded examiner. Multiple measurements were performed on each rat to calculate an average value, and the obtained results were compared between the groups.

3-(1) Hargreaves Test

The Hargreaves test was performed on the 2nd day before surgery (Day-2) and on the 2nd, 7th, 14th, and 27th days after surgery using a Hargreaves test equipment (Ugo Basile Biological Instruments, Gemonio, Italy). The rats were put in separate small chambers (with air holes above) enclosed on all sides and above on a glass plate (Ugo Basile Biological Instruments). The ventral side of the skin incision part was irradiated with an infrared beam as heat stimulation. A latency time to show a withdrawal behavior in response to heat stimulation was recorded. The beam intensity was set to 50% of the maximum output. The cutoff time was set to 20 seconds to prevent tissue damage. Four measurements were performed at each timing for the same rat, with a break of at least 1 minute between each measurement.

3-(2) Von Frey Test

The von Frey test was performed on the 2nd day before surgery (Day-2) and on the 2nd, 7th, 14th, and 27th days after surgery using a dynamic plantar aesthesiometer (Ugo Basile Biological Instruments). The same small chambers as those used in the Hargreaves test was installed on the wire mesh, and the rats were put therein. A filament with the diameter of 0.5 mm was applied to the ventral side of the skin incision part, a force, starting from 0 g and increasing linearly to 5 g, was applied over 10 seconds, and thereafter a constant force of 5 g was applied from the start of the test to until after 30 seconds. The latency time until the rats showed some kind of withdrawal behaviors was recorded. Five measurements were performed at each timing for the same rat, with a break of at least 10 seconds between each measurement.

3-(3) Tail Flick Test

The tail flick test was performed using a heat flux radiometer (manufactured by Ugo Basile Biological Instruments). It was performed on the 1st day before surgery (Day-1) and on the 3rd, 8th, 15th, and 28th days after surgery to avoid tissue damage due to excessive heat stimulation caused by the test being performed on the same schedule as the Hargreaves test. After each rat in a state of being wrapped in a towel was allowed to settle for 10 minutes, only the tail was placed on the device while the body was still covered with the towel, and the ventral side of the proximal part 5 cm from the distal end of the tail was irradiated with an infrared beam. The latency time to a tail-flick response with respect to the heat stimulation was recorded. The cutoff time was set to 20 seconds to prevent tissue damage. Four measurements were performed at each timing for the same rat, with a break of at least 15 seconds between each measurement.

3-(4) Statistical Procedure

All data are expressed as mean±standard error (SE). One-way ANOVA was used for comparison among multiple groups. The unpaired Student-t test was used for comparison between two groups. All ANOVA results were further evaluated using the Tukey-Kramer post-hoc test or the Kruskal-Wallis test. Differences were considered statistically significant at the 5% significance level ($P<0.05$).

3-(5) Results

Figure 6:
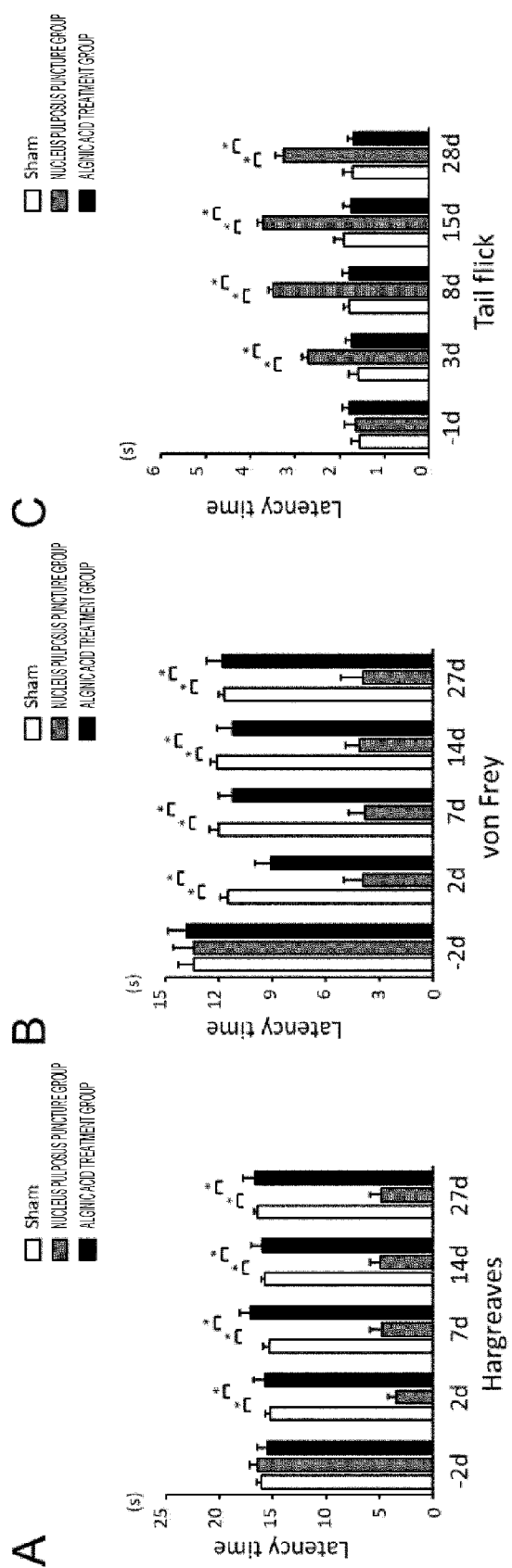
FIG. 6 shows results of pain-related behavioral experiments in a rat intervertebral disc nucleus pulposus defect model. A) Results for Hargreaves analysis, and a latency time until showing a withdrawal behavior with respect to heat stimulation on the 2nd day before surgery (Day-2) and the 2nd, 7th, 14th, and 27th days after the surgery, for sham, a nucleus pulposus puncture group, and an alginic acid treatment group, with *P<0.05; B) Results for von Frey analysis, and a latency time until showing a withdrawal behavior with respect to stimulation by filament on the 2nd day before surgery (Day-2) and the 2nd, 7th, 14th, and 27th days after the surgery, for sham, a nucleus pulposus puncture group, and an alginic acid treatment group, with*P<0.05; and C) Results of Tail flick analysis, and a latency time until showing a tail-flick response with respect to heat stimulation on the 1st day before surgery (Day-1) and the 3rd, 8th, 15th, and 28th days after the surgery, for sham, a nucleus pulposus puncture group, and an alginic acid treatment group, with *P<0.05.

As a result, as shown in FIG. 6, in all the pain-related behavioral analyses, the pain-related behaviors were significantly reduced in the alginic acid treatment group as compared with the nucleus pulposus puncture group. In particular, it was shown that the pain-related behavior was suppressed in the alginic acid treatment group from the early stage which was 2 days after surgery.

Example 4

Effect of Composition Containing Sodium Alginate on Patients with Lumbar Disc Herniation 4-(1) Overview For patients who are planning to undergo discectomy for lumbar disc herniation, a cavity generated after the discectomy for herniation is filled with sodium alginate to gel the surface. The VAS score at 1 week, 4 weeks, 12 weeks, and 24 weeks after the surgery is measured to evaluate performance.

4-(2) Selection Criteria for Test Subject

A target test subject is a test subject who has agreed to participate in the test, has met the registration criteria described below, and has not corresponded to the exclusion criteria.

Test subjects who have met the following criteria are enrolled.

(1) Patients with lumbar disc herniation who are planning to undergo discectomy for lumbar disc herniation (2) Patients for whom disc herniation is recognized on MRI at a site consistent with neurological symptoms (3) Patients whose leg pain is not improved after 6 weeks of conservative treatment, or patients who have acute onset of intolerable leg pain (80 mm or more in 100 mm by VAS)

(4) Patients with lumbar disc herniation at one lumbar segment (5) Patients with leg pain of 40 mm or more in 100 mm in VAS performed before enrolling after acquiring consent (6) Patients aged 20 or older and under the age of 50 years at the time of acquiring consent (7) Patients who have received sufficient explanation about the content of the present clinical trial and from whom the written consent have been obtained 4-(3) Exclusion Criteria for Test Subject The following test subjects are excluded from the test.

(1) Patients with a history of surgery at the site planned for discectomy for lumbar disc herniation (2) Patients with a history of spinal fusion surgery or who are planning to undergo spinal fusion surgery (3) Patients for whom posterior open angle of an intervertebral disc is recognized in any of the anterior, intermediate, and posterior flexion positions in lumbar plain X-ray images (4) Patients for whom greater than grade I spondylolisthesis is recognized at the affected lumbar level (5) Patients with cauda equina syndrome (6) Patients with an acute local or systemic infectious disease (7) Patients suffering from a malignant disease (8) Patients who were drug addicts or patients who are alcoholics (9) Patients suffering from mental illness

(10) Patients for whom fractures, tumors, and deformities are recognized in the lumbar spine on X-ray images

(11) Patients who are currently breastfeeding, pregnant, or wishing to become pregnant during the clinical trial, patients whose partner wishes to become pregnant, or patients who are unable to use effective contraceptive methods.

(12) Patients who participate in other clinical trials that may affect the clinical trial within 4 weeks prior to acquiring consent.

(13) Patients on whom MRI examination cannot be performed due to internal metal such as a pacemaker or claustrophobia

(14) Patients diagnosed as having a positive allergic reaction to sodium alginate by an allergy test (prick test)

(15) Patients who have been judged by the clinical trial investigator or clinical trial doctor to be inappropriate as a subject for the present clinical trial 4-(4) Filling with Sodium Alginate Solution The cavity generated after discectomy for lumbar disc herniation is filled with a sodium alginate solution (maximum of 2 mL). 10 mL of a 0.1 mol/L calcium chloride solution is added to the surface after filling, and after confirming that the sodium alginate solution is gelled, the 0.1 mol/L calcium chloride solution is rinsed with physiological saline.

At 1 week, 4 weeks, 12 weeks, and 24 weeks after the surgery, the VAS scores of lower back pain and leg pain of the target patients are measured.

4-(5)

Filling with the composition containing sodium alginate reduces the VAS scores for lower back pain and leg pain from a timing of a relatively early stage of 1 week and 4 weeks after the surgery. That is, filling the nucleus pulposus defective part with the composition containing sodium alginate can suppress postoperative pain in the acute phase and the subacute phase. There is a tendency for postoperative pain to be diminished even when compared with the case in which only discectomy for lumbar disc herniation is performed.

What is claimed is:

1. A method for suppressing pain at a surgical site and/or a surrounding site thereof which occurs after surgery, the method comprising:
   applying a composition containing a monovalent metal salt of alginic acid to a nucleus pulposus cavity part of an intervertebral disc of a subject in need thereof in an amount effective to suppress expression of at least one factor selected from the group consisting of TNF-α, IL-6, and TrkA in the intervertebral disc, and thus for suppression of pain at the surgical site and/or the surrounding site thereof,
   wherein the pain is postoperative pain occurring from an acute phase to a subacute phase after discectomy,
   wherein the pain is at least one selected from the group consisting of lower back pain, back pain, and buttock pain.

2. The method according to claim 1, wherein the cavity is a resected site after discectomy.

3. A method for suppressing inflammation at a surgical site and/or a surrounding site thereof which occurs after surgery, the method comprising:
   applying a composition containing a monovalent metal salt of alginic acid to a nucleus pulposus cavity part of an intervertebral disc of a subject in need thereof in an amount effective to suppress expression of at least one factor selected from the group consisting of TNF-α, IL-6, and TrkA in the intervertebral disc, and thus for suppression of inflammation at the surgical site and/or the surrounding site thereof,
   wherein the inflammation is postoperative inflammation occurring from an acute phase to a subacute phase after discectomy.

4. The method according to claim 3, wherein the cavity is a resected site after discectomy.

5. The method according to claim 1, further comprising bringing a crosslinking agent into contact with a part of a surface of the composition after application, and the composition has fluidity when applied to the nucleus pulposus cavity part.

6. The method according to claim 5, wherein the crosslinking agent is a divalent or higher valent metal ion compound.

7. The method according to claim 1, wherein a target disease for a surgical medical procedure is at least one disease selected from the group consisting of disc herniation, discopathy, degenerative spondylolisthesis, pyogenic discitis, spondylosis deformans, spinal canal stenosis, and intervertebral disc injuries.

8. The method according to claim 5, wherein an apparent viscosity of the composition having fluidity is 100 mPa·s to 30,000 mPa·s by measurement using a cone-plate viscometer sensor: 35/1, provided that a measurement temperature of the measurement is 20° C., a rotation speed is 0.5 rpm, the measurement is performed for 2.5 minutes as a reading time, and an average value from 0.5 minutes to 2.5 minutes after start is defined as the viscosity.

9. The method according to claim 1, wherein a weight-average molecular weight of the monovalent metal salt of alginic acid is 80,000 or more as measured by a GPC-MALS method.

10. The method according to claim 1, wherein a concentration of the monovalent metal salt of alginic acid in the composition is 0.5 w/v % to 5 w/v %.

11. The method according to claim 1, wherein the monovalent metal salt of alginic acid is a low endotoxin monovalent metal salt of alginic acid.

12. The method according to claim 1, wherein the composition is in a dry state before being applied to the nucleus pulposus cavity part.

13. The method according to claim 1, wherein the composition contains a low endotoxin monovalent metal salt of alginic acid and a crosslinking agent, and is provided in combination as a kit.

14. The method according to claim 1, wherein an expression of at least one factor selected from the group consisting of TNF-α, IL-6, and TrkA in both the nucleus pulposus and the annulus fibrosus is suppressed by the application of the composition to the nucleus pulposus cavity part.

15. The method according to claim 3, wherein an expression of at least one factor selected from the group consisting of TNF-α, IL-6, and TrkA in both the nucleus pulposus and the annulus fibrosus is suppressed by the application of the composition to the nucleus pulposus cavity part.

* * * * *